United States Patent
Raghavan et al.

(10) Patent No.: US 11,770,777 B2
(45) Date of Patent: Sep. 26, 2023

(54) TECHNIQUES FOR POWER CONTROL IN MILLIMETER WAVE SYSTEMS

(71) Applicant: QUALCOMM Incorporated, San Diego, CA (US)

(72) Inventors: Vasanthan Raghavan, West Windsor Township, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 17/394,158

(22) Filed: Aug. 4, 2021

(65) Prior Publication Data
US 2022/0070793 A1    Mar. 3, 2022

Related U.S. Application Data

(60) Provisional application No. 63/073,324, filed on Sep. 1, 2020.

(51) Int. Cl.
*H04W 52/36* (2009.01)
*H04W 24/08* (2009.01)

(52) U.S. Cl.
CPC .......... *H04W 52/36* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 2002/0077141 A1* | 6/2002 | Hwang | H04W 52/24 455/442 |
| 2003/0148780 A1* | 8/2003 | Takano | H04W 52/262 455/70 |
| 2006/0199604 A1* | 9/2006 | Walton | H04W 52/42 455/522 |
| 2009/0196192 A1* | 8/2009 | Lim | H04W 52/247 370/252 |
| 2010/0099449 A1* | 4/2010 | Borran | H04W 52/243 455/501 |
| 2013/0072250 A1* | 3/2013 | Zhang | H04W 52/225 455/522 |
| 2013/0114425 A1* | 5/2013 | Sayana | H04B 7/0413 370/252 |

(Continued)

*Primary Examiner* — Gennadiy Tsvey
(74) *Attorney, Agent, or Firm* — QUALCOMM Incorporated

(57) ABSTRACT

Methods, systems, and devices for wireless communications are described. A first device, which may be a user equipment (UE), may perform a measurement on a wideband channel in a millimeter wave (mmW) frequency band. The wideband channel may include a set of subbands that span the wideband channel. Based on the measurement, the first device may determine a set of power control parameters for the wideband channel. The first device may determine to transmit a signal using a subband of the set of subbands and may modify one or more power control parameters of the set of power control parameters based on a power offset for the subband. The first device may transmit an indication of the modified one or more power control parameters to a second device. The first device may transmit the signal to the second device based on the modified one or more power control parameters.

30 Claims, 18 Drawing Sheets

(56) References Cited

U.S. PATENT DOCUMENTS

| | | | |
|---|---|---|---|
| 2014/0256325 A1* | 9/2014 | Hoirup | H04W 72/0453 |
| | | | 455/450 |
| 2018/0124622 A1* | 5/2018 | Van Der Velde | H04B 17/345 |
| 2018/0227912 A1* | 8/2018 | Chen | H04L 5/0048 |
| 2019/0075525 A1* | 3/2019 | Urabayashi | H04W 72/0473 |
| 2019/0174429 A1* | 6/2019 | Wang | H04W 4/70 |
| 2019/0334666 A1* | 10/2019 | Damnjanovic | H04W 74/006 |
| 2019/0349815 A1* | 11/2019 | Tiirola | H04W 72/12 |
| 2019/0363843 A1* | 11/2019 | Gordaychik | H04L 1/08 |
| 2020/0187128 A1* | 6/2020 | Yao | H04W 52/367 |
| 2021/0329565 A1* | 10/2021 | Höhne | H04W 52/226 |

* cited by examiner

TECHNIQUES FOR POWER CONTROL IN MILLIMETER WAVE SYSTEMS

CROSS REFERENCE

The present Application for Patent claims the benefit of U.S. Provisional Patent Application No. 63/073,324 by Raghavan et al., entitled "TECHNIQUES FOR POWER CONTROL IN MILLIMETER WAVE SYSTEMS," filed Sep. 1, 2020, assigned to the assignee hereof, and expressly incorporated by reference herein.

INTRODUCTION

The following relates to wireless communications, and more specifically to managing power in millimeter wave (mmW) systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method of wireless communications at a first device in a wireless communication system is described. The method may include performing a measurement on a wideband channel in a mmW frequency band, the wideband channel including a set of subbands. The method may also include applying, based on the measurement, a power offset to one or more power control parameters of a set of power control parameters associated with the wideband channel for transmission of a signal using a subband of the set of subbands, the power offset corresponding to the subband, and transmitting an indication of the one or more power control parameters to a second device.

An apparatus for wireless communications at a first device in a wireless communication system is described. The apparatus may include a processor, memory coupled with the processor, and instructions stored in the memory. The instructions may be executable by the processor to cause the apparatus to perform a measurement on a wideband channel in a mmW frequency band, the wideband channel including a set of subbands. The processor and memory may be configured to apply, based on the measurement, a power offset to one or more power control parameters of a set of power control parameters associated with the wideband channel for transmission of a signal using a subband of the set of subbands, the power offset corresponding to the subband and transmit an indication of the one or more power control parameters to a second device.

Another apparatus for wireless communications at a first device in a wireless communication system is described. The apparatus may include means for performing a measurement on a wideband channel in a mmW frequency band, the wideband channel including a set of subbands, means for applying, based on the measurement, a power offset to one or more power control parameters of a set of power control parameters associated with the wideband channel for transmission of a signal using a subband of the set of subbands, the power offset corresponding to the subband, and means for transmitting an indication of the one or more power control parameters to a second device.

A non-transitory computer-readable medium storing code for wireless communications at a first device in a wireless communication system is described. The code may include instructions executable by a processor to perform a measurement on a wideband channel in a mmW frequency band, the wideband channel including a set of subbands. The instructions may be executable by the processor to apply, based on the measurement, a power offset to one or more power control parameters of a set of power control parameters associated with the wideband channel for transmission of a signal using a subband of the set of subbands, the power offset corresponding to the subband and transmit an indication of the one or more power control parameters to a second device.

Some examples of the method, apparatuses, and non-transitory computer-readable medium described herein may further include operations, features, means, or instructions for determining a first timing for modifying the set of power control parameters according to one or more measurements of one or more wideband channels and a second timing for applying one or more power offsets for one or more subbands to the one or more power control parameters.

Some examples of the method, apparatuses, and non-transitory computer-readable medium described herein may further include operations, features, means, or instructions for transmitting, to the second device, a message that indicates the first timing, the second timing, or both.

Some examples of the method, apparatuses, and non-transitory computer-readable medium described herein may further include operations, features, means, or instructions for transmitting the indication of the one or more power control parameters according to the second timing.

Some examples of the method, apparatuses, and non-transitory computer-readable medium described herein may further include operations, features, means, or instructions for performing the measurement according to the first timing.

In some examples of the method, apparatuses, and non-transitory computer-readable medium described herein, the first timing may be greater than the second timing.

Some examples of the method, apparatuses, and non-transitory computer-readable medium described herein may further include operations, features, means, or instructions for determining to switch from a second subband of the set of subbands to the subband before transmission of the signal, the power offset applied based on determining to switch from the second subband to the subband.

Some examples of the method, apparatuses, and non-transitory computer-readable medium described herein may further include operations, features, means, or instructions for receiving, from the second device, an indication of interference on the subband, the power offset applied based on receiving the indication of interference.

In some examples of the method, apparatuses, and non-transitory computer-readable medium described herein, the indication of the one or more power control parameters may include an indication to modify one or more power control parameters at the second device for transmission of a second signal using the subband by the second device. Some examples of the method, apparatuses, and non-transitory computer-readable medium described herein may further include operations, features, means, or instructions for receiving, from the second device, the second signal using the subband based on the indication to modify one or more power control parameters at the second device.

Some examples of the method, apparatuses, and non-transitory computer-readable medium described herein may further include operations, features, means, or instructions for performing the measurement based on a mobility of the first device, a change in a beam direction, a geometry associated with the first device or the second device, or a combination thereof.

Some examples of the method, apparatuses, and non-transitory computer-readable medium described herein may further include operations, features, means, or instructions for determining the power offset corresponding to the subband based on a frequency of the subband, a beam direction, a change in the beam direction, a mobility of the first device, a geometry associated with the first device or the second device, or a combination thereof.

Some examples of the method, apparatuses, and non-transitory computer-readable medium described herein may further include operations, features, means, or instructions for determining the power offset corresponding to the subband from a set of preconfigured power offsets for at least a subset of the set of subbands.

In some examples of the method, apparatuses, and non-transitory computer-readable medium described herein, the first device includes a first UE or a customer premises equipment (CPE), and the second device includes a second UE, a base station, a transmission reception point (TRP), a relay, a repeater, an access node, or an integrated access and backhaul (IAB) node.

In some examples of the method, apparatuses, and non-transitory computer-readable medium described herein, the signal includes a physical uplink shared channel (PUSCH), a physical uplink control channel (PUCCH), or a sounding reference signal (SRS).

A method of wireless communications at a first device in a wireless communication system is described. The method may include transmitting, to a second device, a configuration message that includes a set of power control parameters for communicating using a channel in a mmW frequency band, receiving, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband, and communicating with the second device in accordance with the first timing and the second timing.

An apparatus for wireless communications at a first device in a wireless communication system is described. The apparatus may include a processor, memory coupled with the processor, and instructions stored in the memory. The instructions may be executable by the processor to cause the apparatus to transmit, to a second device, a configuration message that includes a set of power control parameters for communicating using a channel in a mmW frequency band, receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband, and communicate with the second device in accordance with the first timing and the second timing.

Another apparatus for wireless communications at a first device in a wireless communication system is described. The apparatus may include means for transmitting, to a second device, a configuration message that includes a set of power control parameters for communicating using a channel in a mmW frequency band, means for receiving, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband, and means for communicating with the second device in accordance with the first timing and the second timing.

A non-transitory computer-readable medium storing code for wireless communications at a first device in a wireless communication system is described. The code may include instructions executable by a processor to transmit, to a second device, a configuration message that includes a set of power control parameters for communicating using a channel in a mmW frequency band, receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband, and communicate with the second device in accordance with the first timing and the second timing.

Some examples of the method, apparatuses, and non-transitory computer-readable medium described herein may further include operations, features, means, or instructions for configuring the second device with a second set of power control parameters according to the first timing.

Some examples of the method, apparatuses, and non-transitory computer-readable medium described herein may further include operations, features, means, or instructions for receiving, from the second device, an indication of the modified one or more power control parameters according to the second timing.

Some examples of the method, apparatuses, and non-transitory computer-readable medium described herein may further include operations, features, means, or instructions for updating a power variation value for receiving a signal using the subband based on receiving the indication of the first timing and the second timing.

In some examples of the method, apparatuses, and non-transitory computer-readable medium described herein, the first device includes a base station, a TRP, a relay, a repeater, an access node, or an IAB node, and the second device includes a UE or a CPE.

In some examples of the method, apparatuses, and non-transitory computer-readable medium described herein, the first timing may be greater than the second timing.

DETAILED DESCRIPTION

Figure 1:
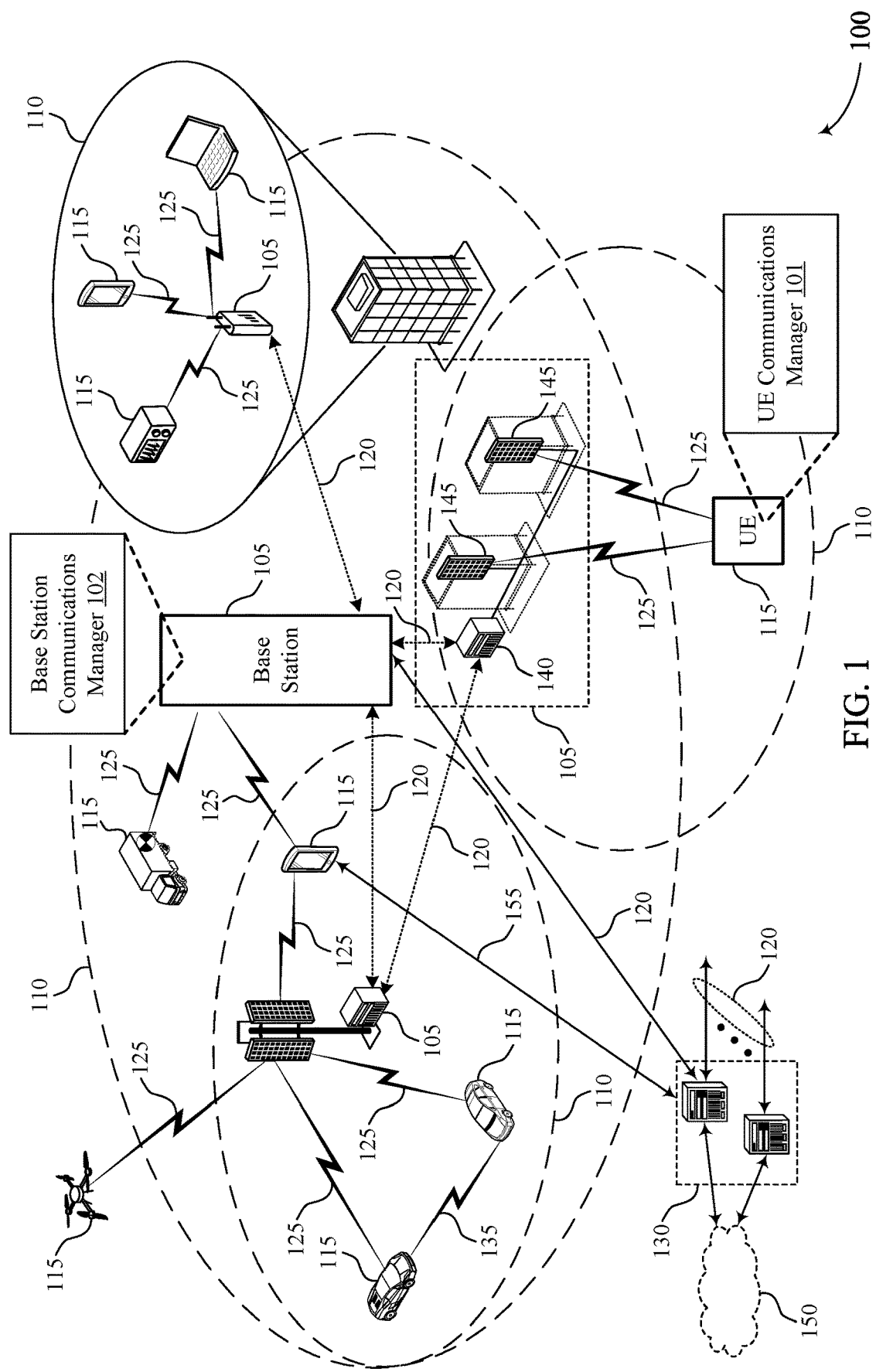
FIGS. 1 and 2 illustrate examples of wireless communications systems that supports techniques for power control in mmW systems in accordance with one or more aspects of the present disclosure.

Some wireless communications systems may include communication devices, such as a UE and a base station (e.g., an eNodeB (eNB), a next-generation NodeB or a giga-NodeB, either of which may be referred to as a gNB, or some other base station), that may support multiple radio access technologies (RATs). Examples of RATs include 4G systems, such as LTE systems, and 5G systems, which may be referred to as NR systems. In some examples, a wireless communications system may support communications within an upper mmW frequency band. The upper mmW frequency band may be a frequency band that includes frequencies above 52.6 Gigahertz (GHz). In some cases, the upper mmW band may be referred to as the frequency range 4 (FR4) spanning 52.6 to 114.25 GHz; frequency range 5 (FR5) which, in some examples, may span 114.25 GHz to 300 GHz; sub-Terahertz (THz) range spanning 100 GHz to 1000 GHz, or the THz range spanning 100 GHz to 3000 GHz.

A UE and a base station may communicate within the upper mmW band or another radio frequency spectrum band using an ultrawide bandwidth. An aggregated channel bandwidth may be considered an ultrawide bandwidth if the aggregated channel bandwidth exceeds a threshold percentage (e.g., 20%, 30%) of a range of the frequency band in which the bandwidth is located. For example, for a frequency band spanning 57 GHz to 71 GHz (i.e., a frequency range of 14 GHz), a bandwidth spanning at least 20% of 14 GHz (e.g., a bandwidth spanning at least 2.8 GHz) may be considered an ultrawide bandwidth.

Additionally or alternatively, an ultrawide bandwidth may include a set of subbands or channels, where each subband or channel spans a given range (e.g., 2 GHz) that is semi-statically or dynamically configured. For instance, a set of 3 channels of 2 GHz each within the 57 GHz-71 GHz frequency band may be considered an ultrawide bandwidth as the set of 3 channels spans 6 GHz, which is greater than the threshold percentage (e.g., 20% or 30%).

In some examples, a UE and a base station may communicate using a wideband channel spanning an ultrawide bandwidth that includes a set of subbands (e.g., each spanning 2 GHz, or some other frequency range). In some cases, the UE and the base station may use beamformed transmissions to communicate on one or multiple subbands of the wideband channel.

To support communications over the wideband channel, the UE may use a power control loop to determine a transmit power for transmissions. In some examples, the UE may determine a set of power control parameters of the power control loop for the wideband channel, or the UE may determine the set of power control parameters for one or multiple subbands of the wideband channel. In some cases, a frequency variation across the wideband channel may be relatively flat, while beam squinting effects (e.g., a beam direction of a beamformed transmission at one carrier frequency may be different from a beam direction of the beamformed transmission at a different carrier frequency causing signal loss of the beamformed transmission) may cause wide variations in a beamforming array gain across the wideband channel. The UE may compensate for array gain variations by determining the set of power control parameters for a subband of the wideband channel on which it communicates. However, when switching to communicate on another subband, the UE may determine a new set of power control parameters even though adjusting one or more power control parameters of the set of power control parameters may compensate for an array gain variation between the subbands. Additionally, or alternatively, the base station may configure the UE with the set of power control parameters each time the UE, or the base station, or both, switch to communicate using another subband. This may result in a large increase in signaling overhead between the UE and the base station when communicating over the wideband channel. It may therefore be desirable to improve power control without increasing signaling overhead.

Techniques described herein are directed to increasing power control using power offsets for subbands of the wideband channel. For example, the base station may configure the UE with a set of power control parameters for communicating using the wideband channel. The UE may perform a measurement on the wideband channel and may determine a set of power control parameters for the wideband channel based on the measurement, or the configuration by the base station, or both. The UE may determine to transmit a signal to a device (e.g., to the base station, to another UE, or to some other device) using a subband of the set of subbands of the wideband channel. The UE may modify one or more power control parameters of the set of power control parameters for transmission of the signal based on a power offset for the subband. For example, the UE may apply a power offset for the subband (e.g., a fixed power offset, a preconfigured power offset) to the one or more power control parameters to tune the power at which the UE may transmit the signal. The UE may transmit an indication of the modified one or more power control parameters to the device and may communicate with the device based on the modified one or more power control parameters. In this way, the UE may compensate for an array gain variation or other variation for the subband that may result in channel performance degradation or signal loss without increasing signaling overhead between the UE and the base station.

In some examples, the UE may determine a first timing (e.g., an update period) for performing the measurement on the wideband channel and a second timing for modifying the one or more power control parameters. For example, the UE may perform the measurement on the wideband channel and modify the set of power control parameters according to the first timing, and may modify the one or more power control parameters according to the second timing. In some cases, the first timing is greater than the second timing. The UE may transmit a message that indicates the first timing and the second timing to the base station, and the UE and the base station may communicate according to the first timing and the second timing.

Aspects of the subject matter described in this disclosure may be implemented to realize one or more of the following potential improvements, among others. The techniques employed by the UEs may provide benefits and enhancements to the operation of the UEs. For example, operations performed by the UEs may provide improvements to channel performance and signaling overhead. In some examples, modifying power control parameters using a power control offset for a subband may allow the UE to compensate for array gain variations across a wideband channel without increasing signaling overhead. In some other examples, modifying power control parameters using a power control offset for a subband may provide improvements to power consumption, spectral efficiency, and, in some examples, may promote highly reliable and low latency communications, among other benefits.

Aspects of the disclosure are initially described in the context of wireless communications systems. Additional aspects are described in the context of frequency graphs and process flows. Aspects of the disclosure are further illustrated by and described with reference to apparatus diagrams, system diagrams, and flowcharts that relate to techniques for power control in mmW systems.

FIG. 1 illustrates an example of a wireless communications system 100 that supports techniques for power control in mmW systems in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices. In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may support communications within an upper mmW frequency band. The upper mmW frequency band may be a frequency band that includes frequencies above 52.6 Gigahertz (GHz). In some cases, the upper mmW band may be referred to as the frequency range 4 (FR4) spanning 52.6 to 114.25 GHz; frequency range 5 (FR5) which, in some examples, may span 114.25 GHz to 300 GHz; sub-Terahertz (THz) range spanning 100 GHz to 1000 GHz, or the THz range spanning 100 GHz to 3000 GHz.

A UE 115 and a base station 105 may communicate within the upper mmW band or another radio frequency spectrum band using an ultrawide bandwidth. An aggregated channel bandwidth may be considered an ultrawide bandwidth if the aggregated channel bandwidth exceeds a threshold percentage (e.g., 20%, 30%) of a range of the frequency band in which the bandwidth is located. For example, for a frequency band spanning 57 GHz to 71 GHz (i.e., a frequency range of 14 GHz), a bandwidth spanning at least 20% of 14 GHz (e.g., a bandwidth spanning at least 2.8 GHz) may be considered an ultrawide bandwidth.

Additionally or alternatively, an ultrawide bandwidth may include a set of subbands or channels, where each subband or channel spans a given range (e.g., 2 GHz) that is semi-statically or dynamically configured. For instance, a set of 3 channels of 2 GHz each within the 57 GHz-71 GHz frequency band may be considered an ultrawide bandwidth as the set of 3 channels spans 6 GHz, which is greater than the threshold percentage (e.g., 20% or 30%).

A UE 115 may communicate with a device (e.g., a base station 105 or another UE 115) using a wideband channel spanning an ultrawide bandwidth that includes a set of subbands or channels (e.g., each spanning 2 GHz, or some other frequency range). In some cases, the UE 115 and the base station 105 may use beamformed transmissions to communicate on one or multiple subbands or channels of the wideband channel.

In some examples, the UE 115 may support a small number (e.g., 1, 2, or some other number) of radio frequency (RF) chains. An RF chain may include a set of phase shifters that tune beam weights for beamformed transmissions to control a beam direction. In some cases, using the small number of RF chains may constrain analog or radio frequency beamforming. That is, the UE 115 may use the same set of beam weights for beamformed transmissions even in the event of a frequency switch within the ultrawide bandwidth. For example, the UE 115 may operate at a first subband (e.g., 69 GHz to 71 GHz) and use a first set of beam weights corresponding to a first beam direction for communications with the device. After some time, the UE 115 may switch to a second operating subband (e.g., 57 GHz to 59 GHz) and use the same first set of beam weights for communications with the device. However, in some cases, analog/radio frequency codebook's array gain may change with frequency (e.g., beam squinting) especially in the first beam direction. In other words, the first beam direction at one frequency may drift in angle or beamspace at a different frequency.

To support communications using the wideband channel, the UE 115 may use a power control loop to determine a transmit power for transmissions. In some cases, a frequency variation across the wideband channel may be relatively flat, while beam squinting effects (e.g., caused by the small number of RF chains) may cause wide variations in an array gain across the wideband channel. The UE 115 may compensate for array gain variations by determining a set of power control parameters for a subband of the wideband channel on which it communicates with the device. However, when switching to communicate on another subband, the UE 115 may determine a new set of power control parameters even though adjusting one or more power control parameters of the set of power control parameters may compensate for an array gain variation between the subbands. Additionally, or alternatively, a base station 105 may configure the UE 115 with the set of power control parameters each time the UE 115, or the base station 105, or both, switch to communicate using another subband. This may result in a large increase in signaling overhead between the UE 115 and the base station 105 when communicating over the wideband channel. It may therefore be desirable to improve power control without increasing signaling overhead.

The wireless communications system 100 may support using power offsets for subbands of a wideband channel to increase power control. For example, the UE 115 may include a UE communications manager 101 that enables the UE 115 to perform a wideband measurement and to determine a set of power control parameters for the wideband channel based on the measurement. The UE 115 may determine to transmit a signal to the device using a subband of the set of subbands of the wideband channel. The UE 115 may modify one or more power control parameters of the set of power control parameters for transmission of the signal based on a power offset for the subband. For example, the UE 115 may apply a power offset for the subband (e.g., a fixed power offset, a preconfigured power offset) to the one or more power control parameters to tune the power at which the UE 115 may transmit the signal. The UE 115 may transmit an indication of the modified one or more power control parameters to the device and may communicate with the device based on the modified one or more power control parameters.

A base station 105 may include a base station communications manager 102 that enables the base station 105 to configure the UE 115 with the set of power control parameters for communicating using the wideband channel. The base station 105 may receive a message from the UE 115 that indicates a first timing for modifying the set of power control parameters according to measurements performed by the UE 115 of the wideband channel. Additionally, the message may indicate a second timing for modifying the one or more power control parameters based on a power offset for a subband of the set of subbands. The base station 105 and the UE 115 may communicate according to the first timing and the second timing.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
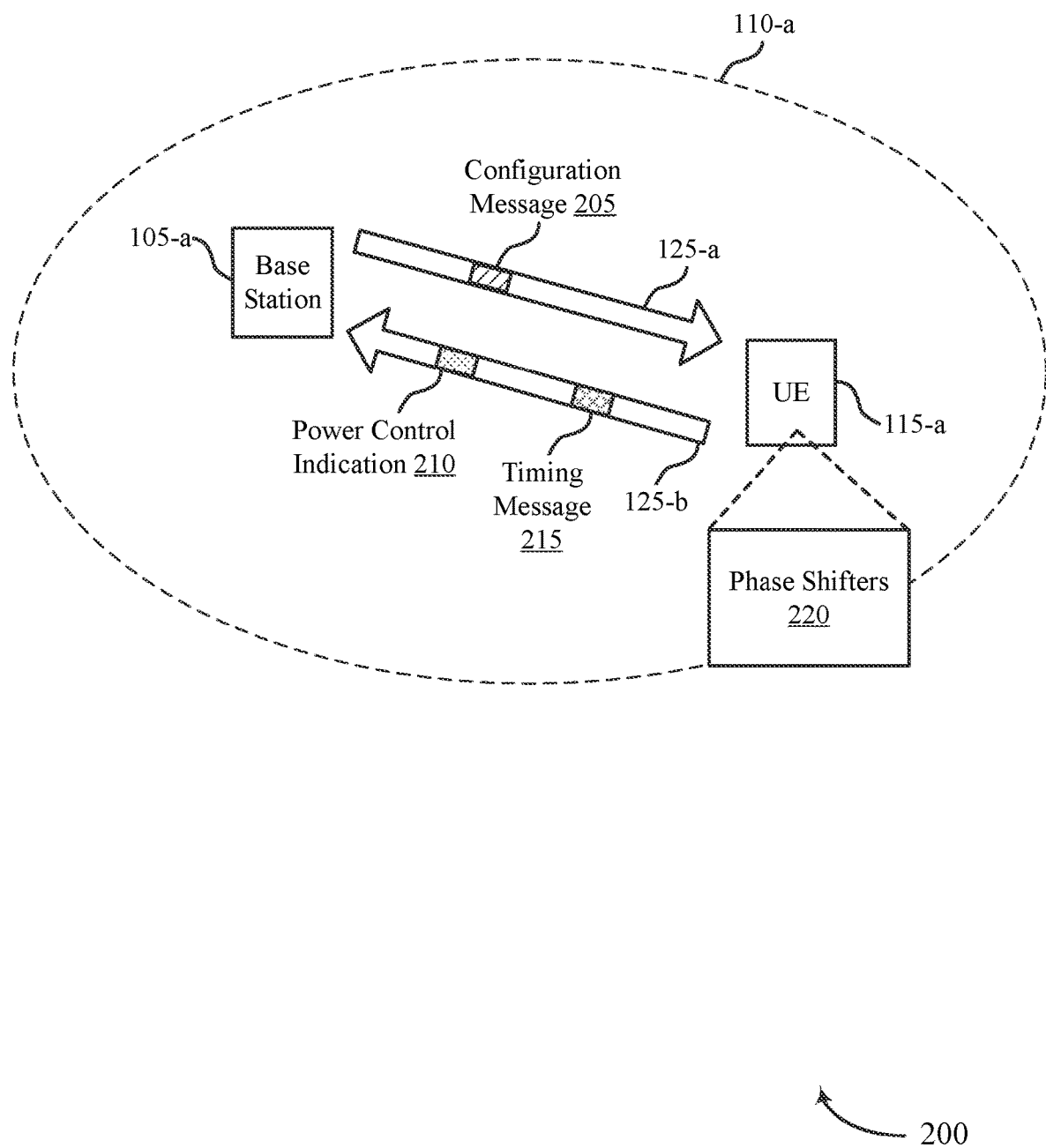

FIG. 2 illustrates an example of a wireless communications system 200 that supports techniques for power control in mmW systems in accordance with one or more aspects of the present disclosure. In some examples, wireless communications system 200 may implement aspects of wireless communication system 100. For example, the wireless communications system 200 may include a base station 105-a and a UE 115-a within a geographic coverage area 110-a. The base station 105-a and the UE 115-a may be examples of a base station 105 and a UE 115 as described with reference to FIG. 1. The base station 105-a and the UE 115-a may communicate with one another via a communication link 125-a and communication link 125-b, which may be examples of a communication link 125 as described with reference to FIG. 1. In some examples, the base station 105-a may transmit downlink transmissions via communication link 125-a and the UE 115-a may transmit uplink transmission via communication link 125-b. In some examples, the UE 115-a may be a CPE. In some examples, the base station 105-a may be a TRP, a relay, a repeater, an access node, or an IAB node.

The wireless communications system 200 may support communications in an upper mmW band (e.g., 52.6 GHz and above). For example, the base station 105-a and the UE 115-a may communicate within the upper mmW band using a wideband channel that spans an ultrawide bandwidth. The wideband channel may include a set of subbands or channels, where each subband or channel spans a given range (e.g., 2 GHz) that is semi-statically or dynamically configured. To support communications using the wideband channel, the UE 115-a may use a power control loop to determine a transmit power for a transmission. For example, the UE 115-a may determine a transmit power for a transmission according to the following power control loop equation:

$$P_{PUSCH}(i) = \min\{P_{CMAX}, 10\log_{10}(M_{PUSCH}(i)) + P_O(j) + \alpha(j)*PL + \Delta_{tf}(i) + f(i)\} \quad (1)$$

where $P_{PUSCH}(i)$ is the determined transmit power for the transmission, $P_{CMAX}$ is a maximum transmit power at the UE 115-a, $M_{PUSCH}$ is a number of resource blocks, $P_O(j)$ is target base station receive power, $\alpha(j)$ is an optimization parameter between 0 and 1 (e.g., set low when an interference level is high, set high to compensate for path loss), PL is a path loss value, $\Delta_{tf}(i)$ is a power offset for a transmission format (e.g., a modulation and coding scheme (MCS)), and $f(i)$ is a closed loop power control function. $\alpha(j)*PL$ may correspond to a propagation loss and an array gain due to beamforming. In some examples, propagation loss may be a function of a carrier frequency for the transmission. Additionally, array gain may be a function of the carrier frequency. For example, the UE 115-a may have a fixed inter-antenna element spacing used in an antenna array to communicate within the upper mmW band. Due to the fixed inter-antenna element spacing, the array gain may change as a function of the carrier frequency at a specific angle of interest.

In some cases, a frequency variation across the wideband channel may be relatively flat, while beam squinting effects (e.g., due to fixed inter-antenna element spacing of an antenna array, or by the small number of RF chains used by the UE 115-a, or both) may cause wide variations in array gain across the wideband channel across different angles of interest.

In order to compensate for variations in array gain, the wireless communications system 200 may support using power offsets for subbands of the wideband channel when determining the transmit power for transmissions. For example, the UE 115-a may determine a set of power control parameters for communicating with the base station 105-a over the wideband channel. That is, the UE 115-a may determine a set of power control parameters associated with the variables of the power control loop equation (1), where the set of power control parameters are based on the ultrawide bandwidth of the wideband channel. In some examples, the base station 105-a may configure the set of power control parameters and transmit a configuration message 205 to the UE 115-a. The UE 115-a may receive the configuration message 205 and determine the set of power control parameters based on the configuration message 205. In some cases, the UE 115-a may perform a measurement of the wideband channel to determine the set of power control parameters. The UE 115-a may perform a measurement of the wideband channel to determine a frequency variation across the wideband channel based on a channel impulse response of the wideband channel. Based on the frequency variation across the wideband channel, the UE 115-a may determine the set of power control parameters. In some cases, the UE 115-a may perform the measurement based on a mobility of the UE 115-a, a change in a beam direction of a beam used to communicate with the base station 105-a, a geometry associated with the UE 115-a or the base station 105-a, or a combination thereof. In some cases, the UE 115-a may determine the set of power control parameters based on the configuration message 205 and the measurement of the wideband channel.

The UE 115-a may modify one or more power control parameters of the set of power control parameters to compensate for array gain variation. For example, the UE 115-a may determine to transmit a signal to a device (e.g., the base station 105-a, another UE 115 (not shown), or another device (not shown)), using a subband of the set of subbands of the wideband channel. In some cases, the signal may include a PUSCH, a PUCCH, or an SRS. The UE 115-a may modify the one or more power control parameters based on a power offset associated with the subband. For example, the UE 115-a may apply the power offset to the one or more control parameters to compensate for an array gain variation associated with the subband.

The UE 115-a may include phase shifters 220 within an antenna module or a radio frequency integrated circuit (RFIC) that has an integrated antenna module that enable the UE 115-a to communicate with the base station 105-a or another device using one or more beams. For example, each antenna element of an antenna array of the UE 115-a may be coupled with a phase shifter. By adjusting the phase value of the phase shifters 220, the UE 115-a may steer a beam over a range of directions. The UE 115-a may transmit and receive signals using the beam to increase the likelihood that the signals are decoded. The UE 115-a may adjust the phase of the phase shifters 220, and therefore steer the beam, using a set of beam weights. In some cases, the beam weights are tuned for a first subband on which the UE 115-a and the base station 105-a communicate. However, when switching to communicate on a second subband, the beam may change directions due to the beam weights being tuned for the first subband thereby causing signal loss in the original beam direction. By applying the power offset to the modified one or more power control parameters, the UE 115-a may compensate for the change in beam direction and signal loss without tuning the set of beam weights for the second subband.

The UE 115-*a* may transmit an indication of the modified one or more power control parameters. For example, the UE 115-*a* may transmit a power control indication 210 to the base station 105-*a* that indicates the modified one or more power control parameters. In some cases, the base station 105-*a* may update a power variation value for receiving the signal based on receiving the power control indication 210. For example, the base station 105-*b* may expect a transmit power of the signal to be within a range of decibels (dBs). In order to successfully receive and decode the signal, the base station may update the power variation value that indicates the range of dBs. In some examples, the power control indication 210 may include an indication to modify one or more power control parameters at the base station 105-*a* for transmission of a second signal using the subband by the base station 105-*a*. The UE 115-*a* may receive the second signal from the base station 105-*a* based on the indication. In some examples, the UE 115-*a* may transmit the power control indication 210 to a device (e.g., another UE 115) of the wireless communications system 200. In some cases, the power control indication 210 transmitted to the device may include an indication to modify one or more power control parameters at the device for transmission of a third signal using the subband by the device. The UE 115-*a* may receive the third signal based on the indication.

The UE 115-*a* may determine timings (e.g., update periods) for modifying the set of power control parameters and for modifying the one or more power control parameters. For example, the UE 115-*a* may determine a first timing for modifying the set of power control parameters and a second timing for modifying the one or more power control parameters. The UE 115-*a* may transmit a timing message 215 to the base station 105-*a* that indicates the first timing and the second timing. In some examples, the UE 115-*a* may perform the measurement of the wideband channel according to the first timing. The UE 115-*a* may update the set of control parameters based on the performing the measurement of the wideband channel according to the first timing. For example, the UE 115-*a* may have previously determined the set of control parameters by performing a first measurement of the wideband channel. An amount of time later corresponding to the first timing, the UE 115-*a* may perform a second measurement of the wideband channel and may update the set of control parameters based on the second measurement. Additionally or alternatively, the base station 105-*a* may configure the UE 115-*a* with a second set of power control parameters for communicating using the wideband channel according to the first timing.

In some examples, the UE 115-*a* may modify the one or more control parameters according to the second timing. For example, the UE 115-*a* may determine a time-scale to track an evolution of a beam (e.g., a performance of the beam, a beam direction, or some other beam parameter) used by the UE 115-*a* to transmit signals to the base station 105-*a*. The UE 115-*a* may modify the one or more power control parameters according to the time-scale to track the evolution of the beam. In some examples, the UE 115-*a* may transmit the power control indication 210 according to the second timing. In some cases, the first timing is greater than the second timing. For example, the frequency variation across the channel bandwidth may change slower relative to array gain variations for different subbands of the wideband channel. The UE 115-*a* may therefore determine to modify the set of power control parameters according to the first timing at a slower rate than modifying the one or more power control parameters of the set of power control parameters according to the second timing.

The UE 115-*a* may receive an indication of interference on the subband from a device (e.g., the base station 105-*a*, another UE 115 (not shown), or another device (not shown)). For example, the device and the UE 115-*a* may communicate using the wideband channel. In some cases, beam squinting effects may cause transmissions from the UE 115-*a* to cause interference at the device on one or more subbands of the wideband channel. The device may transmit the indication of the interference to the UE 115-*a* and the UE 115-*a* may modify the one or more power control parameters based on receiving the indication of interference on the subband.

The UE 115-*a* may determine to switch from a second subband to the subband to transmit the signal. For example, the base station 105-*a* may dynamically or semi-statically configure the UE 115-*a* to use the subband to transmit the signal. In some cases, in order to transmit the signal using the subband, the UE 115-*a* may switch from a second subband to the subband. The UE 115-*a* may determine that switching from the second subband to the subband may result in an array gain different from an array gain associated with the second subband. The UE 115-*a* may determine a power offset associated with the subband and apply the power offset to the one or more power control parameters to transmit the signal using the subband. The UE 115-*a* may therefore modify the one or more power control parameters based on switching from the second subband to the subband. The wireless communications system 200 may, as a result, include features for the improvements to power control for communications within an upper mmW band. In some examples, the wireless communications system 200 may promote high reliability and low latency communications and may provide improvements to power consumption, thermal mitigation, and spectral efficiency, among other benefits.

Figure 3:
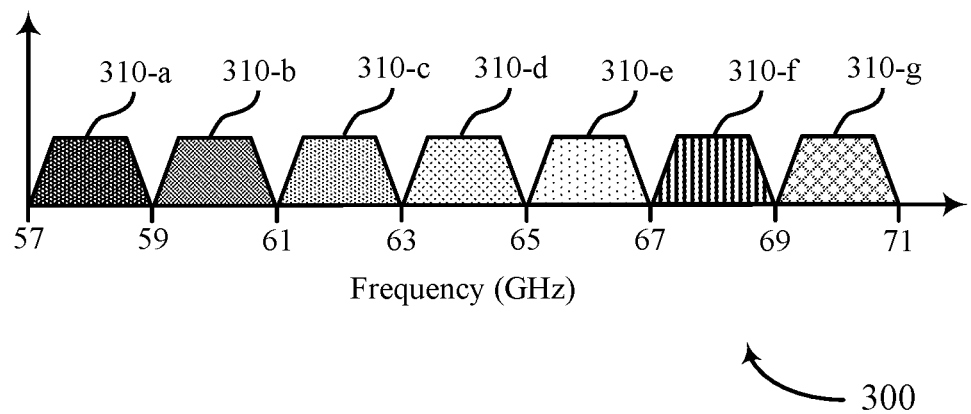
FIG. 3 illustrates an example of frequency graphs that support techniques for power control in mmW systems in accordance with one or more aspects of the present disclosure.
Figure 3:
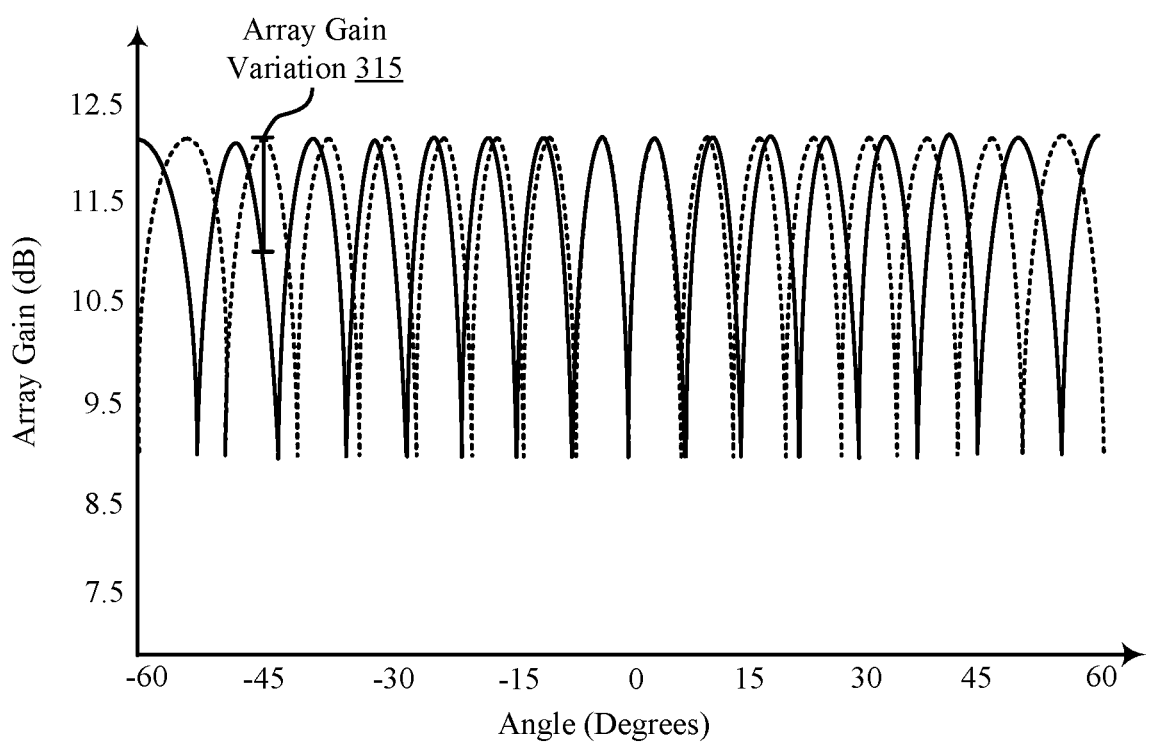

FIG. 3 illustrates an example of a frequency graph 300 and a frequency graph 305 that support techniques for power control in mmW systems in accordance with one or more aspects of the present disclosure. In some examples, frequency graph 300 and frequency graph 305 may implement aspects of wireless communications systems 100 and 200 as described with reference to FIGS. 1 and 2, respectively.

The frequency graph 300 may represent multiple channels 310 (e.g., subbands) in which a base station 105 and a UE 115 may be capable of operating. In some examples, the base station 105 and the UE 115 may use a wideband channel spanning an ultrawide bandwidth to communicate. The wideband channel may include the channels 310, and, in some examples, the base station 105 and the UE 115 may hop between channels 310 when communicating. For example, the UE 115 may operate according to frequencies within channels 310-*a*, 310-*b*, 310-*c*, 310-*d*, 310-*e*, 310-*f*, and 310-*g*, where each channel 310 spans 2 GHz. In some examples, the UE 115 may use multiple channels 310 (e.g., in a carrier aggregation framework) to communicate with the base station 105.

The frequency graph 305 may represent an array gain associated with different beam angles as a function of frequency. A UE 115 may transmit a signal 320 according to a frequency. For example, the UE 115 may transmit a signal 320-*a* at 67 GHz and a signal 320-*b* at 71 GHz. Additionally or alternatively, the UE 115 may transmit the signal 320-*a* and the signal 320-*b* in at various angles. For example, the frequency graph 305 shows an array gain of signal 320-*a* and an array gain of signal 320-*b* as a function of the angle at which the UE 115 transmits the signal 320-*a* and the signal 320-*b*.

Beam squinting effects may cause variations between the array gain of signal 320-a and the array gain of signal 320-b. For example, the array gain of signal 320-a transmitted at −45° may be approximately 12 dB, while the array gain of the signal 320-b transmitted at −45° may be approximately 11 dB. That is, transmitting a signal 320 in the same direction but using different frequencies may cause an array gain variation 315 in an array gain of the signal 320.

A UE 115 may compensate for the array gain variation 315 using a power offset associated with a channel 310. For example, the UE 115 may communicate with a base station 105 using the channel 310-f. The UE 115 may determine to communicate with the base station 105 using the channel 310-g (e.g., based on a dynamic or semi-static configuration from the base station 105). The UE 115 may determine that communicating using the channel 310-g may result in an array gain variation 315. In some cases, the array gain variation 315 may be large enough to result in channel performance degradation, signal loss, decoding errors using a mismatched MCS, or a combination thereof. The UE 115 may determine a power offset associated with the channel 310-g and apply the power offset to one or more power control parameters of a set of power control parameters used to communicate on the wideband channel. By applying the power offset to the one or more power control parameters, the UE 115 may calculate a transmit power to use when communicating using the channel 310-g without needing to determine a set of power control parameters specific to the channel 310-g.

In some examples, the UE 115 may determine the power offset from a set of power offsets. In some cases, the set of power offsets may be associated with a subset of the set of subbands. In some other cases, the set of power offsets may be associated with the set of subbands. In some examples, the UE 115 may determine the power offset based on a frequency of the subband. For example, the UE 115 may compare the frequency of the subband to frequencies associated with the set of power offsets and may select the power offset from the set of power offsets based on the comparison. In some examples, the UE 115 may determine the power offset based on a beam direction of a beam used to transmit a signal 320, a change in the beam direction, a mobility of the UE 115, a geometry associated with the UE 115 or the device, or a combination thereof. In some cases, the set of power offsets may be configured (e.g., by a base station 105). In some other cases, the set of power offsets may be preconfigured.

Figure 4:
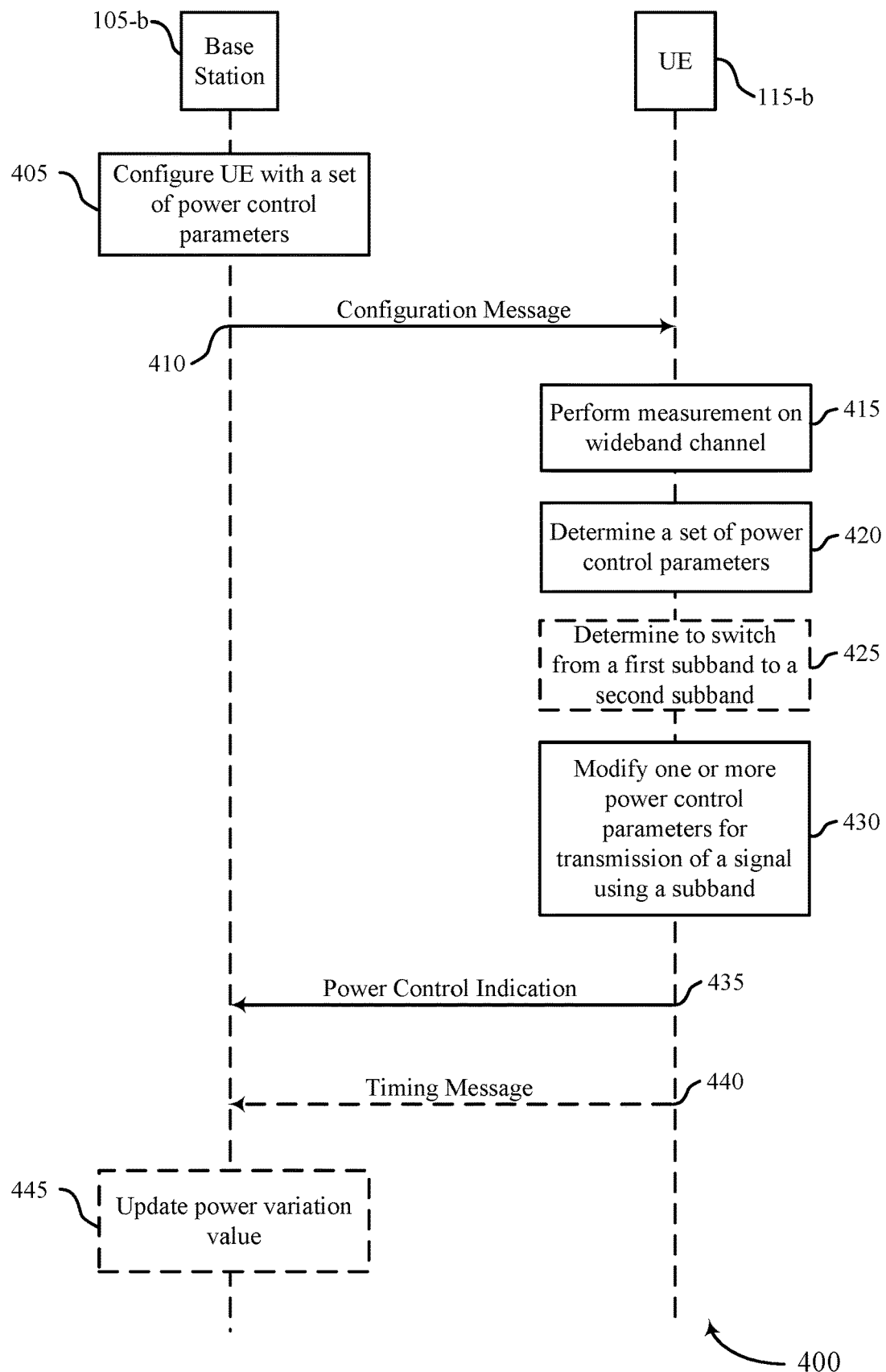
FIG. 4 illustrates an example of a process flow that supports techniques for power control in mmW systems in accordance with one or more aspects of the present disclosure.

FIG. 4 illustrates an example of a process flow 400 that supports techniques for power control in mmW systems in accordance with one or more aspects of the present disclosure. In some examples, process flow 400 may implement aspects of wireless communications systems 100 and 200 as described with reference to FIGS. 1 and 2, respectively. The process flow 400 may be based on a configuration by a base station 105-b, and implemented by a UE 115-b to promote power control and array gain compensation by supporting applying power offsets to transmissions of signals for particular subbands of a wideband channel. The process flow 400 may be based on a configuration be the base station 105-b, and implemented by the UE 115-b to achieve higher reliability and lower latency transmissions for the UE 115-b by supporting applying power offsets to transmissions of signals for particular subbands of a wideband channel.

The base station 105-b and the UE 115-b may be examples of a base station 105 and a UE 115, as described herein. In the following description of the process flow 400, the operations between the base station 105-b and the UE 115-b may be performed in a different order than the example order shown, or the operations performed by the base station 105-b and the UE 115-b may be performed in different orders or at different times. Some operations may also be omitted from the process flow 400, and other operations may be added to the process flow 400.

At 405, the base station 105-b may configure the UE 115-b with a set of power control parameters for communicating using a wideband channel that includes a set of subbands spanning the bandwidth of the wideband channel. In some cases, the wideband channel may span an ultrawide bandwidth within an upper mmW frequency band. At 410, the base station 105-b may transmit a configuration message to the UE 115-b that indicates the set of power control parameters.

At 415, the UE 115-b may perform a measurement of the wideband channel. For example, the UE 115-b may determine a frequency variation across the wideband channel based on a channel impulse response of the wideband channel.

At 420, the UE 115-b may determine the set of power control parameters for communicating with the base station 105-b using the wideband channel. In some cases, the UE 115-b may determine the set of power control parameters based on the configuration message, or the measurement of the wideband channel, or both.

At 425, the UE 115-b may optionally determine to switch from a first subband of the set of subbands to a second subband of the set of subbands before transmitting a signal to the base station 105-b. For example, the UE 115-b may determine to transmit a signal to the base station 105-b using the second subband and may have previously operated using the first subband. The UE 115-b may therefore switch from using the first subband to using the second subband to transmit the signal.

At 430, the UE 115-b may modify one or more power control parameters of the set of power control parameters for transmitting the signal using the second subband. The UE 115-b may modify the one or more power control parameters based on a power offset (e.g., a fixed power offset, a preconfigured power offset) for the second subband. For example, the UE 115-b may determine a power offset (e.g., from a set of power offsets) associated with the second subband and apply the power offset to the one or more power control parameters. At 435, the UE 115-b may transmit an power control indication to the base station 105-b that indicates the modified one or more power control parameters.

At 440, the UE 115-b may optionally transmit a timing message to the base station 105-b that indicates a first timing (e.g., an update period) for performing the measurement on the wideband channel and a second timing for modifying the one or more power control parameters. For example, the UE 115-b may determine the first timing and the second timing and transmit the timing message the base station 105-b. In some cases, the UE 115-b may perform the measurement of the wideband channel at 415 according to the first timing and may modify the one or more control parameters at 430 according to the second timing. In some cases, the first timing is greater than the second timing.

At 445, the base station 105-b may update a power variation value for receiving the signal using the second subband based on receiving the timing message. For example, the base station 105-b may expect a transmit power of the signal to be within a range of dBs. In order to successfully receive and decode the signal without modifying an MCS used to communicated with the UE, the base station may update the power variation value that indicates the range of dBs.

Figure 5:
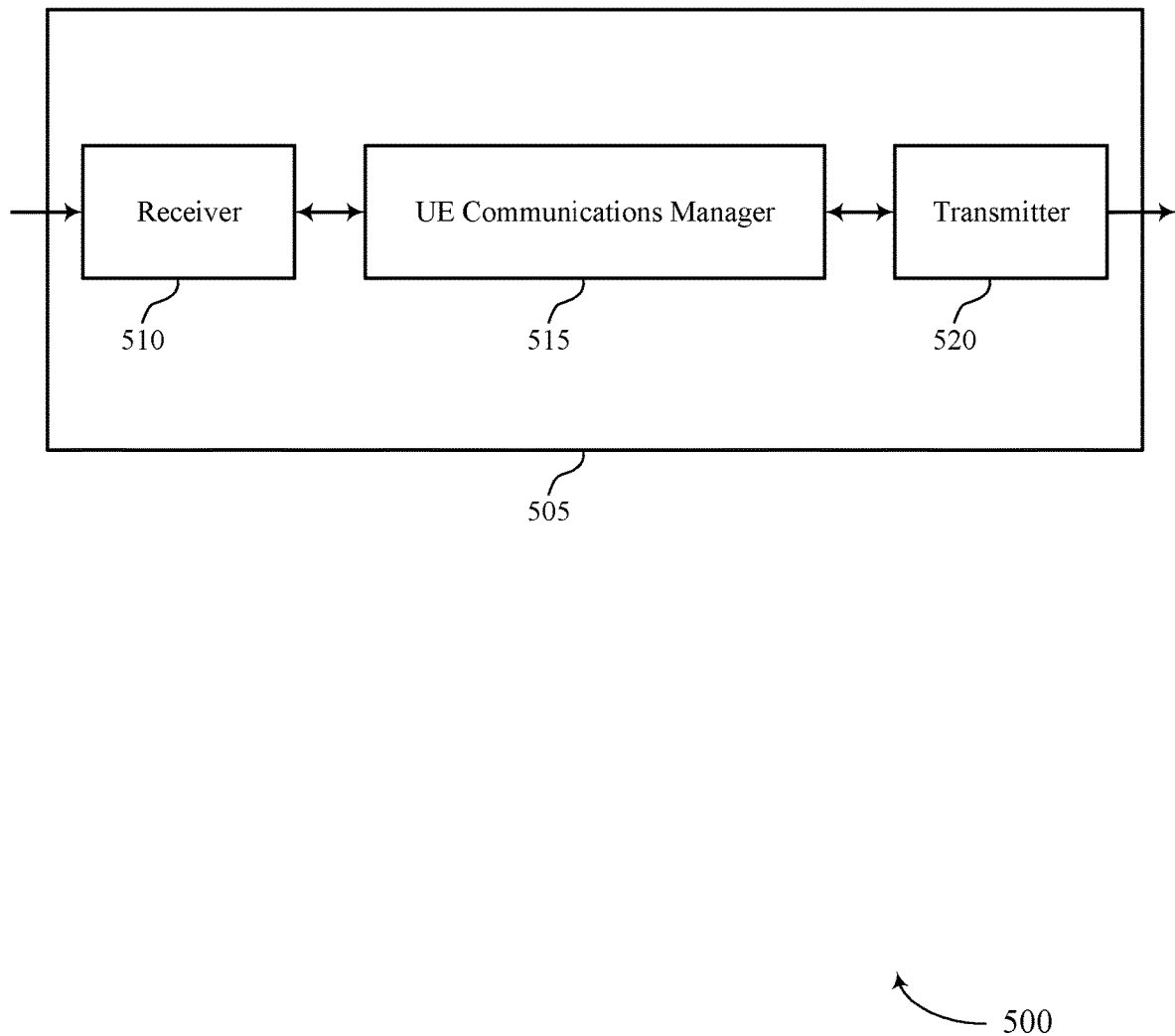
FIGS. 5 and 6 show block diagrams of devices that support techniques for power control in mmW systems in accordance with one or more aspects of the present disclosure.

FIG. 5 shows a block diagram 500 of a device 505 that supports techniques for power control in mmW systems in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for power control in mmW systems, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may perform a measurement on a wideband channel in a mmW frequency band, the wideband channel including a set of subbands, determine a set of power control parameters for the wideband channel based on the measurement, apply, based at least in part on the measurement, a power offset to one or more power control parameters of the set of power control parameters for transmission of a signal using a subband of the set of subbands, the power offset corresponding to the subband, and transmit an indication of the one or more power control parameters to a second device. The UE communications manager 515 may be an example of aspects of the UE communications manager 810 described herein.

The UE communications manager 515 as described herein may be implemented to realize one or more potential improvements. At least one implementation may enable the UE communications manager 515 to modify power control parameters using a power control offset for a subband. Based on implementing the modifying, one or more processors of the device 505 (e.g., processor(s) controlling or incorporated with the UE communications manager 515) may promote improvements to power control and, in some examples, may promote spectral efficiency, higher data rates, reduced processing, reduced power consumption, more efficient utilization of communication resources, and enhanced efficiency for high reliability and low latency operations, among other benefits by applying power offsets to compensate for array gain variations.

The UE communications manager 515 may be an example of means for performing various aspects of managing power control as described herein. The UE communications manager 515, or its sub-components, may be implemented in hardware (e.g., in communications management circuitry). The circuitry may include a processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the UE communications manager 515, or its sub-components, may be implemented in code (e.g., software or firmware) executed by a processor. If implemented in code executed by a processor, the functions of the UE communications manager 515, or its sub-components may be executed by a general-purpose processor, a DSP, an ASIC, an FPGA or other programmable logic device.

In some examples, the UE communications manager 515 may be configured to perform various operations (e.g., performing, determining, modifying, transmitting) using or otherwise in cooperation with the receiver 510, the transmitter 520, or both.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
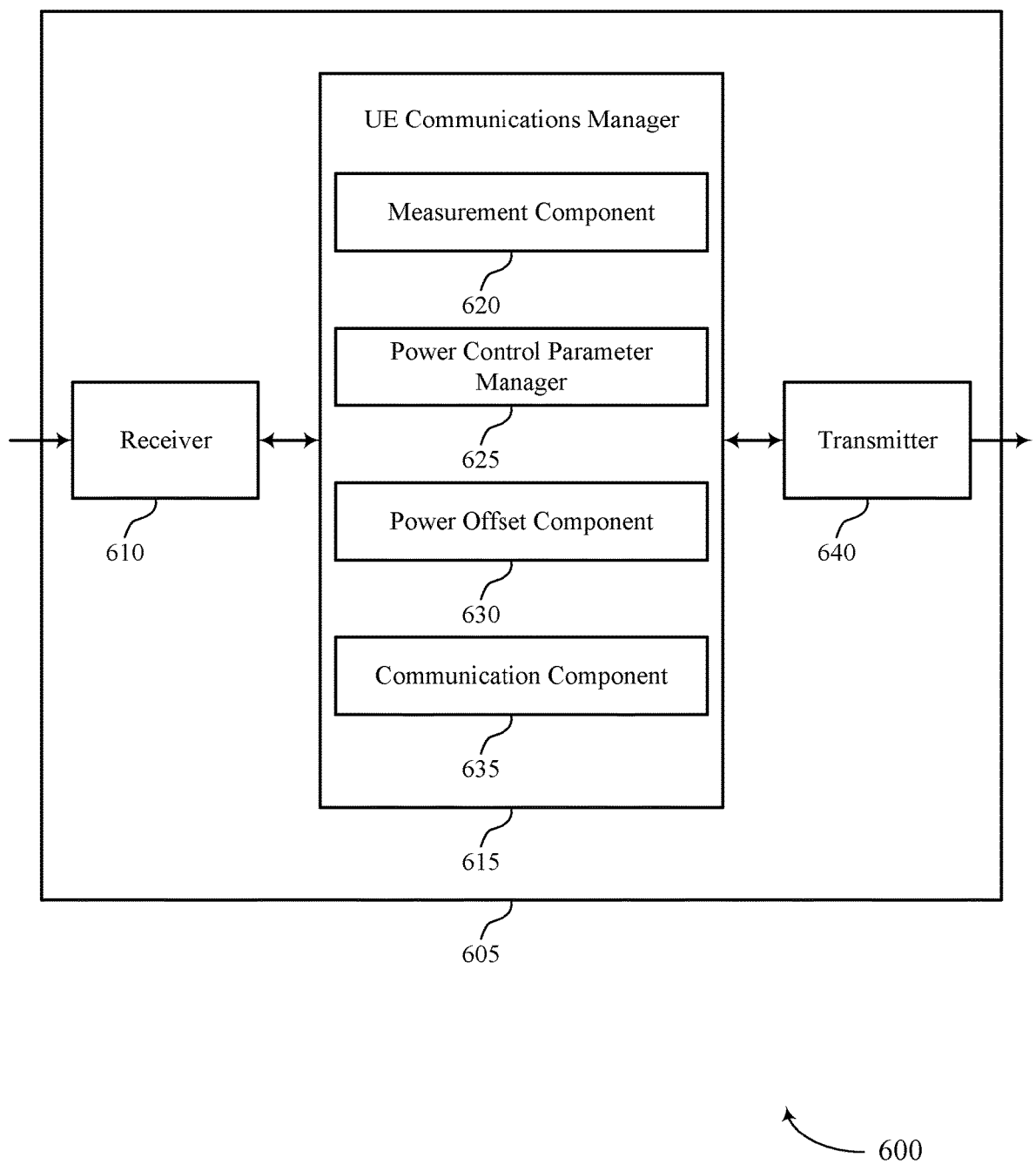

FIG. 6 shows a block diagram 600 of a device 605 that supports techniques for power control in mmW systems in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for power control in mmW systems, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a measurement component 620, a power control parameter manager 625, a power offset component 630, and a communication component 635. The UE communications manager 615 may be an example of aspects of the UE communications manager 810 described herein.

The measurement component 620 may perform a measurement on a wideband channel in a mmW frequency band, the wideband channel including a set of subbands.

The power control parameter manager 625 may determine a set of power control parameters for the wideband channel based on the measurement.

The power offset component 630 may apply, based at least in part on the measurement, a power offset one or more power control parameters of the set of power control parameters for transmission of a signal using a subband of the set of subbands, the power offset correspond to the subband.

The communication component 635 may transmit an indication of the one or more power control parameters to a second device.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
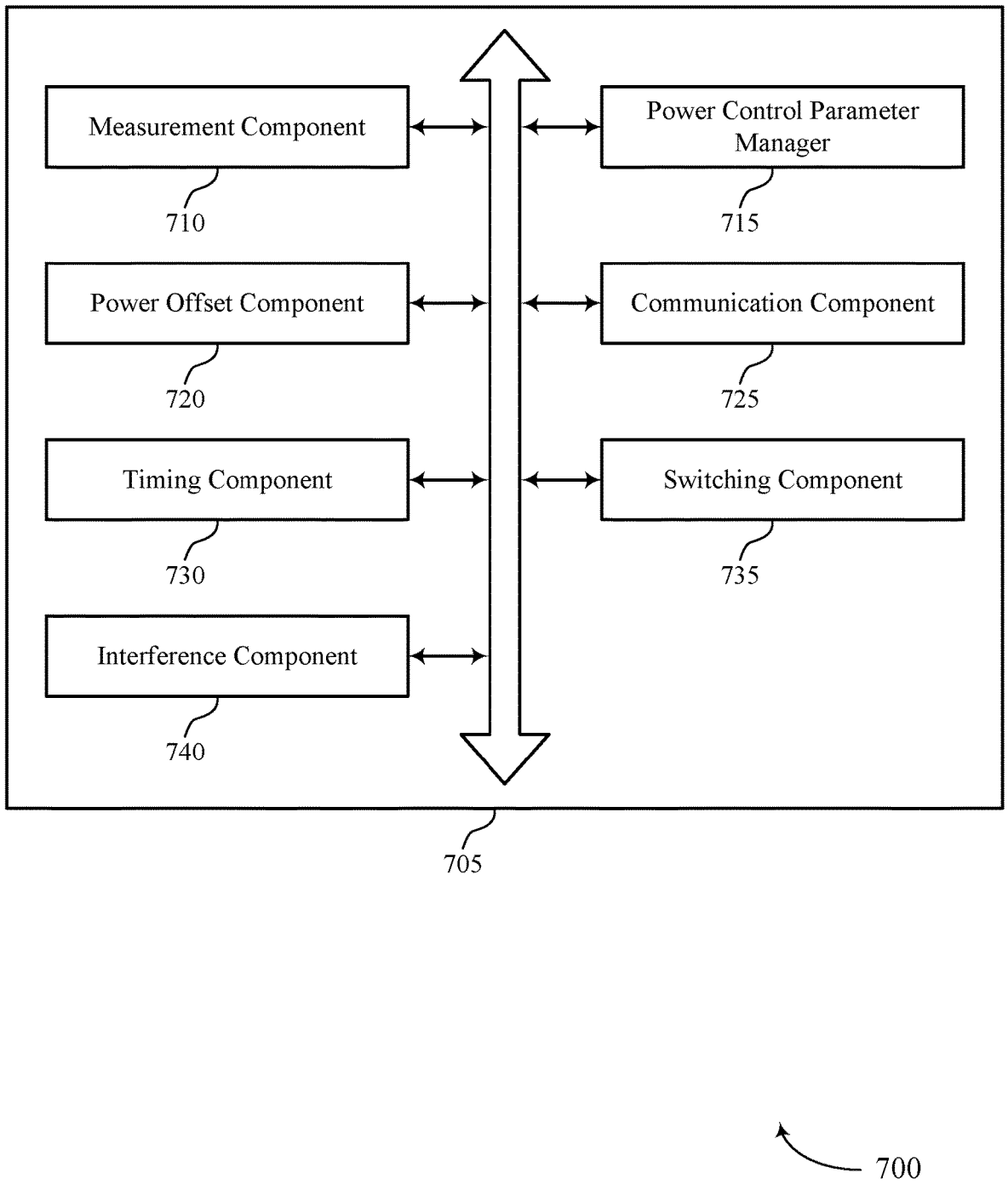
FIG. 7 shows a block diagram of a UE communications manager that supports techniques for power control in mmW systems in accordance with one or more aspects of the present disclosure.

FIG. 7 shows a block diagram 700 of a UE communications manager 705 that supports techniques for power control in mmW systems in accordance with aspects of the present disclosure. The UE communications manager 705 may be an example of aspects of a UE communications manager 515, a UE communications manager 615, or a UE communications manager 810 described herein. The UE communications manager 705 may include a measurement component 710, a power control parameter manager 715, a power offset component 720, a communication component 725, a timing component 730, a switching component 735, an interference component 740, or some combination thereof. Each of these components may communicate, directly or indirectly, with one another (e.g., via one or more buses).

The measurement component 710 may perform a measurement on a wideband channel in a mmW frequency band, the wideband channel including a set of subbands. In some cases, the measurement component 710 may perform the measurement based on a mobility of the first device, a change in a beam direction, a geometry associated with the first device or the second device, or a combination thereof.

The power control parameter manager 715 may determine a set of power control parameters for the wideband channel based on the measurement.

The power offset component 720 may modify one or more power control parameters of the set of power control parameters for transmission of a signal using a subband of the set of subbands based on a power offset for the subband. In some examples, the power offset component 720 may apply the power offset to the one or more power control parameters. In some examples, the power offset component 720 may determine the power offset for the subband based on a frequency of the subband, a beam direction, a change in the beam direction, a mobility of the first device, a geometry associated with the first device or the second device, or a combination thereof. In some cases, the power offset component 720 may determine the power offset for the subband from a set of preconfigured power offsets for at least a subset of the set of subbands. In some instances, the signal includes a PUSCH, a PUCCH, or an SRS.

The communication component 725 may transmit an indication of the one or more power control parameters to a second device. In some examples, the indication of the one or more power control parameters includes an indication to modify one or more power control parameters at the second device for transmission of a second signal using the subband by the second device. In some examples, the communication component 725 may receive, from the second device, the second signal using the subband based on the indication to modify one or more power control parameters at the second device.

In some cases, the first device includes a first UE or a CPE. In some cases, the second device includes a second UE, a base station, a TRP point, a relay, a repeater, an access node, or an IAB node.

The timing component 730 may determine a first timing for modifying the set of power control parameters according to one or more measurements of one or more wideband channels and a second timing for modifying the one or more power control parameters according to one or more power offsets for one or more subbands. In some examples, the second timing may be for applying the one or more power offsets to the one or more power control parameters. In some examples, the timing component 730 may transmit, to the second device, a message that indicates the first timing, the second timing, or both. In some examples, the timing component 730 may transmit the indication of the one or more power control parameters according to the second timing. In some cases, the first timing is greater than the second timing. In some examples, the measurement component 710 may perform the measurement according to the first timing.

The switching component 735 may determine to switch from a second subband of the set of subbands to the subband before transmission of the signal, the one or more power control parameters modified based on determining to switch from the second subband to the subband. In some examples, the power offset is applied based on determining to switch from the second subband to the subband.

The interference component 740 may receive, from the second device, an indication of interference on the subband, the one or more power control parameters modified based on receiving the indication of interference. In some examples, the power offset is applied based on receiving the indication of interference.

Figure 8:
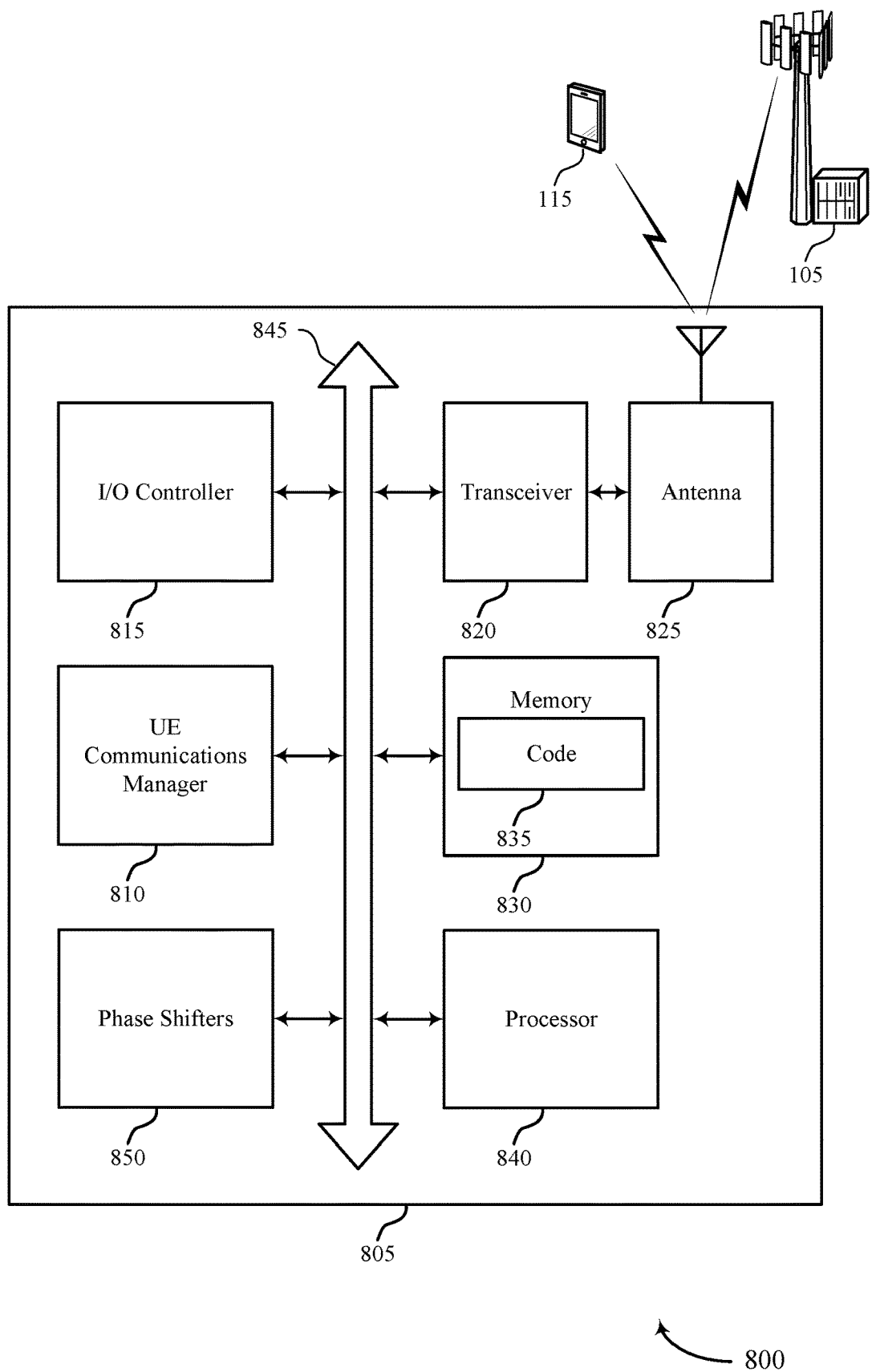
FIG. 8 shows a diagram of a system including a device that supports techniques for power control in mmW systems in accordance with one or more aspects of the present disclosure.

FIG. 8 shows a diagram of a system 800 including a device 805 that supports techniques for power control in mmW systems in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may perform a measurement on a wideband channel in a mmW frequency band, the wideband channel including a set of subbands, determine a set of power control parameters for the wideband channel based on the measurement, apply, based at least in part on the measurement, the power offset to one or more power control parameters of the set of power control parameters for transmission of a signal using a subband of the set of subbands, the power offset corresponding to the subband, and transmit an indication of the one or more power control parameters to a second device. At least one implementation may enable the UE communications manager 810 to modify power control parameters using a power control offset for a subband. Based on implementing the modifying, one or more processors of the device 505 (e.g., processor(s) controlling or incorporated with the UE communications manager 515) may promote improvements to power control and, in some examples, may promote spectral efficiency, higher data rates, and enhanced efficiency for high reliability and low latency operations, among other benefits by applying power offsets to compensate for array gain variations.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for power control in mmW systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The phase shifters 850 may be included in an RF chain of the device 805. The phase shifters 850 may be used to tune beam weights for a beamformed transmission to control a beam direction. In some examples, the phase shifters 850 may be tuned for communications on one or more subbands of a wideband channel in a mmW frequency band. In some cases, the phase shifters 850 may be included in an antenna module external to the modem of the transceiver 820.

Figure 9:
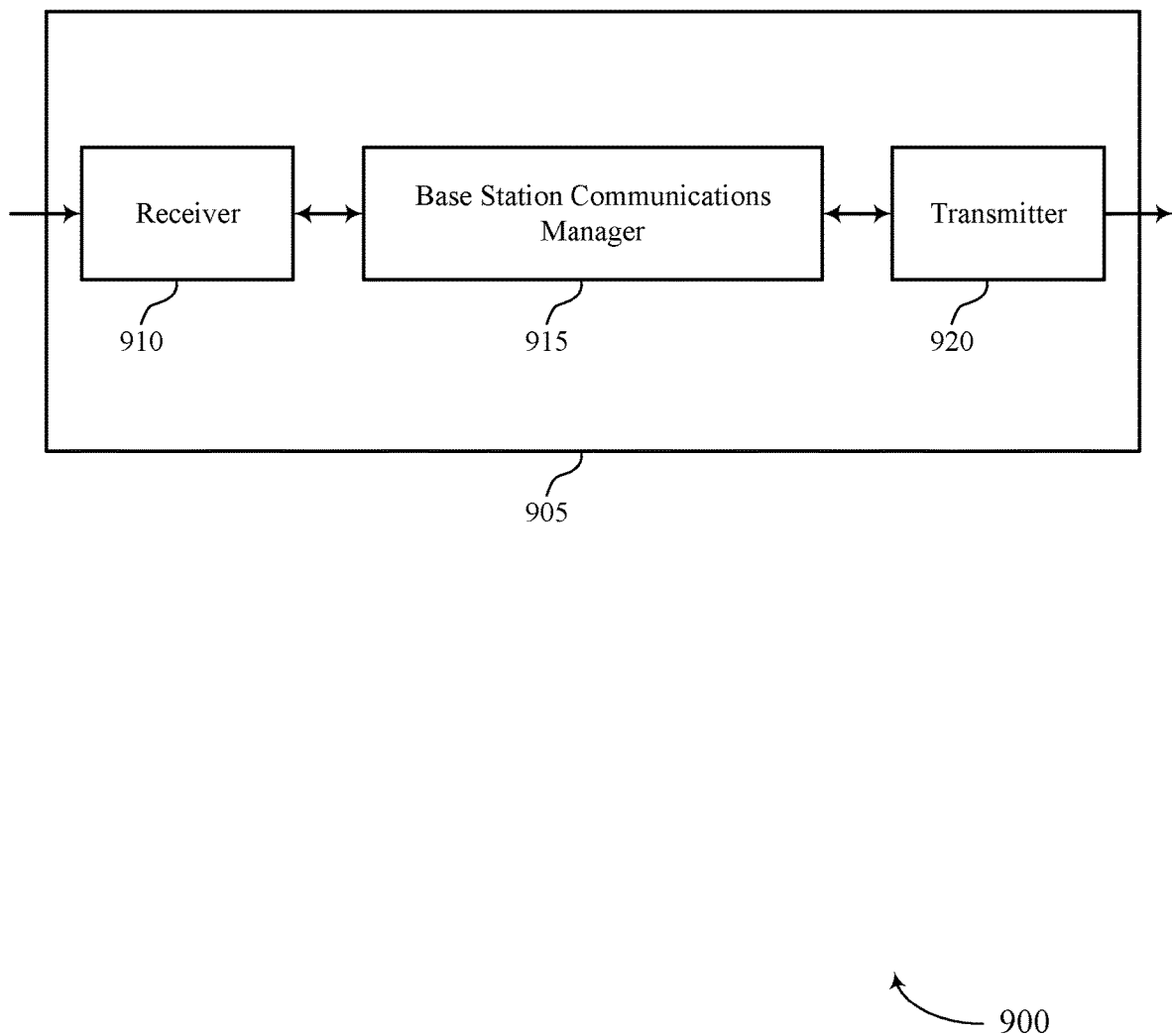
FIGS. 9 and 10 show block diagrams of devices that support techniques for power control in mmW systems in accordance with one or more aspects of the present disclosure.

FIG. 9 shows a block diagram 900 of a device 905 that supports techniques for power control in mmW systems in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for power control in mmW systems, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may transmit, to a second device, a configuration message that includes a set of power control parameters for communicating using a channel in a mmW frequency band, receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband, and communicate with the second device in accordance with the first timing and the second timing. The base station communications manager 915 may be an example of aspects of the base station communications manager 1210 described herein.

By including or configuring the base station communications manager 915 in accordance with examples as described herein, the device 905 (e.g., a processor controlling or otherwise coupled to the receiver 910, the base station communications manager 915, the transmitter 920, or a combination thereof) may support techniques for reduced processing, reduced power consumption, and more efficient utilization of communication resources by communicating in accordance with timings for modifying power control parameters.

The base station communications manager 915 may be an example of means for performing various aspects of managing power control as described herein. The base station communications manager 915, or its sub-components, may be implemented in hardware (e.g., in communications management circuitry). The circuitry may include a processor, a DSP, an ASIC, an FPGA or other programmable logic device, discrete gate or transistor logic, discrete hardware components, or any combination thereof designed to perform the functions described in the present disclosure.

In another implementation, the base station communications manager 915, or its sub-components, may be implemented in code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device.

In some examples, the base station communications manager 915 may be configured to perform various operations (e.g., configuring, receiving) using or otherwise in cooperation with the receiver 910, the transmitter 920, or both.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
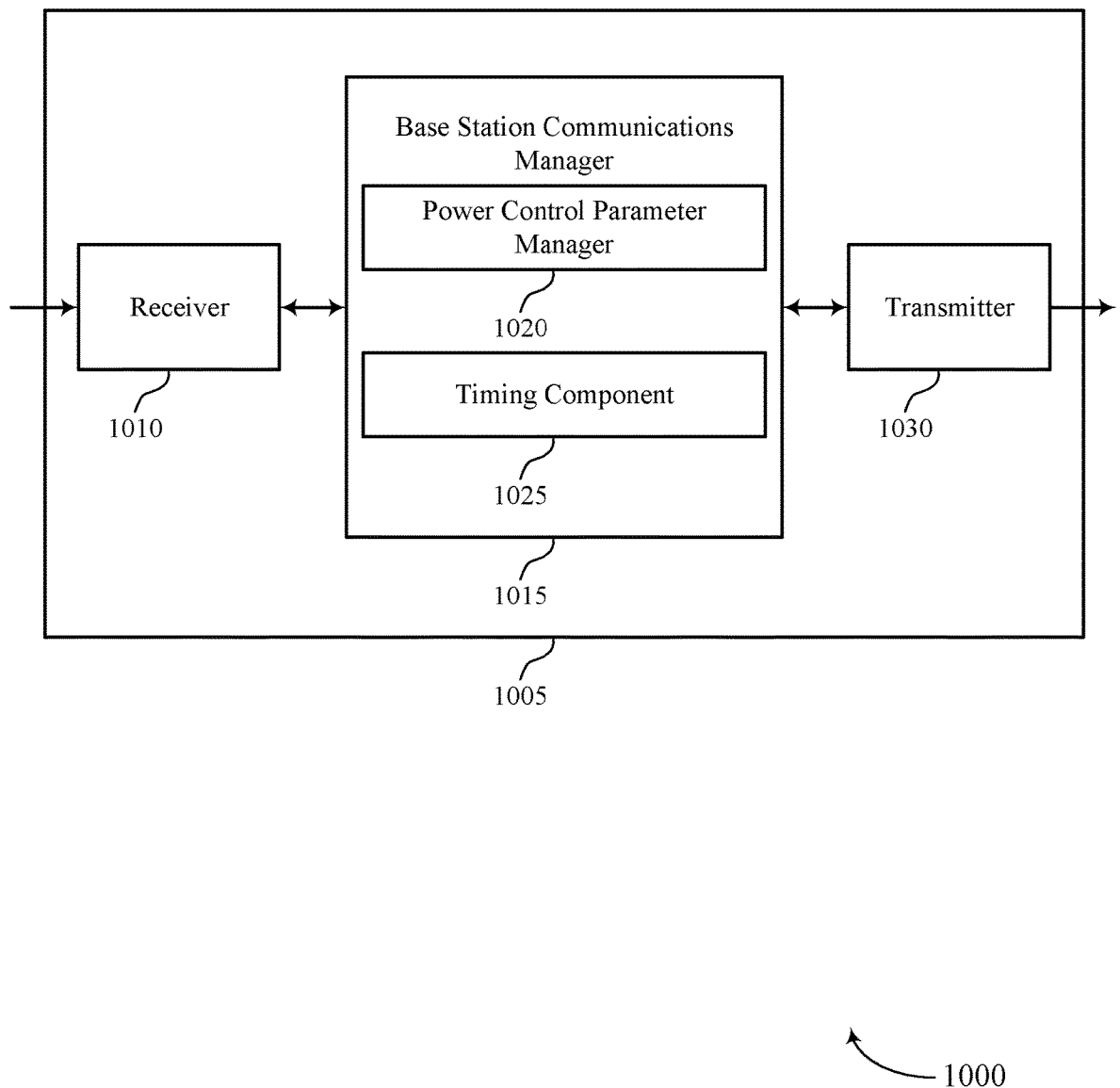

FIG. 10 shows a block diagram 1000 of a device 1005 that supports techniques for power control in mmW systems in accordance with aspects of the present disclosure. The device 1005 may be an example of aspects of a device 905, or a base station 105 as described herein. The device 1005 may include a receiver 1010, a base station communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for power control in mmW systems, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a power control parameter manager 1020 and a timing component 1025. The base station communications manager 1015 may be an example of aspects of the base station communications manager 1210 described herein.

The power control parameter manager 1020 may transmit, to a second device, a configuration message that includes a set of power control parameters for communicating using a channel in a mmW frequency band.

The timing component 1025 may receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband. The timing component 1025 may communicate with the second device in accordance with the first timing and the second timing.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
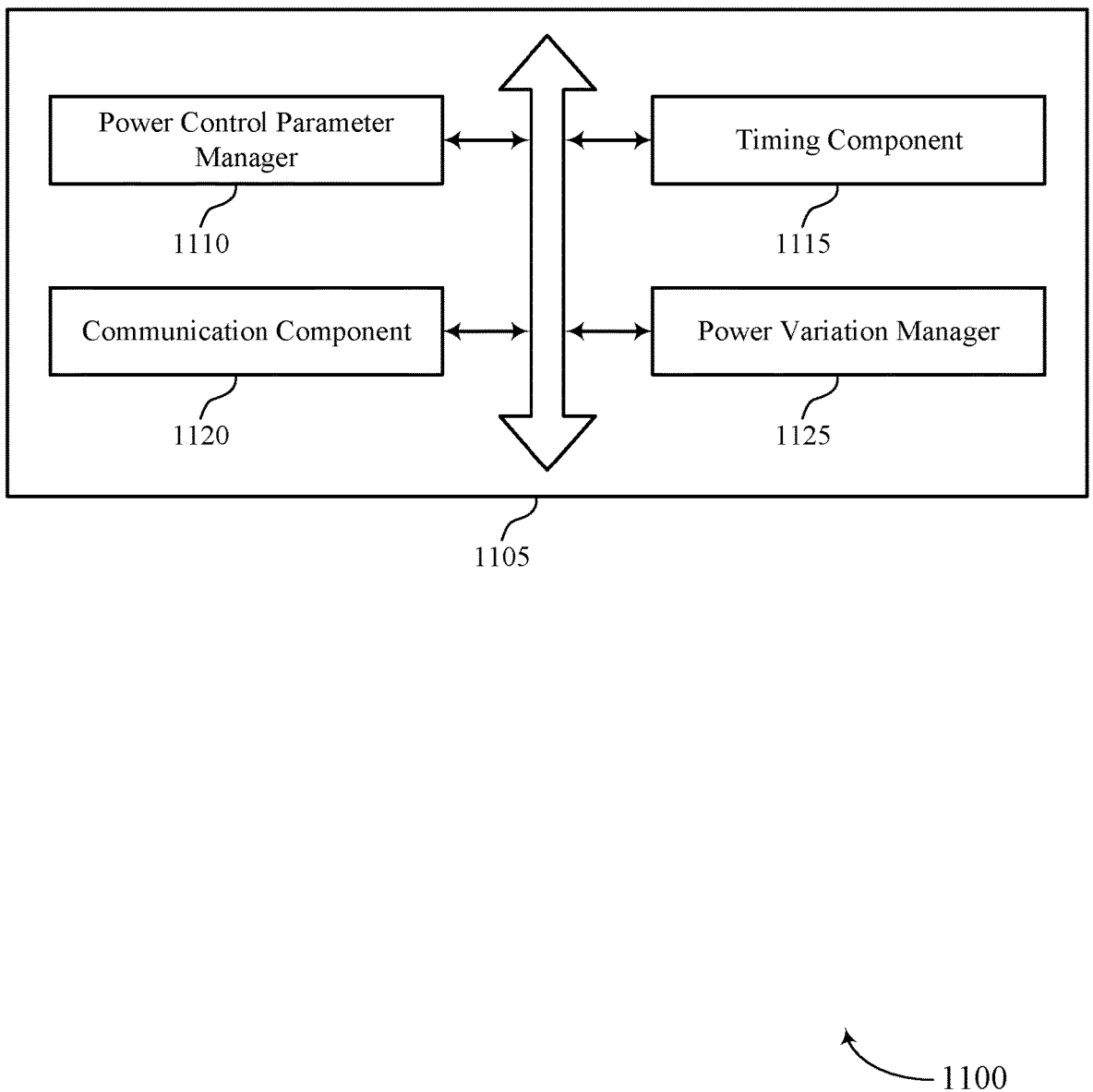
FIG. 11 shows a block diagram of a base station communications manager that supports techniques for power control in mmW systems in accordance with one or more aspects of the present disclosure.

FIG. 11 shows a block diagram 1100 of a base station communications manager 1105 that supports techniques for power control in mmW systems in accordance with aspects of the present disclosure. The base station communications manager 1105 may be an example of aspects of a base station communications manager 915, a base station communications manager 1015, or a base station communications manager 1210 described herein. The base station communications manager 1105 may include a power control parameter manager 1110, a timing component 1115, a communication component 1120, a power variation manager 1125, or some combination thereof. Each of these components may communicate, directly or indirectly, with one another (e.g., via one or more buses).

The power control parameter manager 1110 may transmit, to a second device, a configuration message that includes a set of power control parameters for communicating using a channel in a mmW frequency band.

In some cases, the first device includes a base station, a TRP, a relay, a repeater, an access node, or an IAB node. In some cases, the second device includes a UE or a CPE.

The timing component 1115 may receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband. In some examples, the timing component 1115 may communicate with the second device in accordance with the first timing and the second timing. In some cases, the first timing is greater than the second timing.

In some examples, the power control parameter manager 1110 may configure the second device with a second set of power control parameters according to the first timing.

The communication component 1120 may receive, from the second device, an indication of the modified one or more power control parameters according to the second timing.

The power variation manager 1125 may update a power variation value for receiving a signal using the subband based on receiving the indication of the first timing and the second timing.

Figure 12:
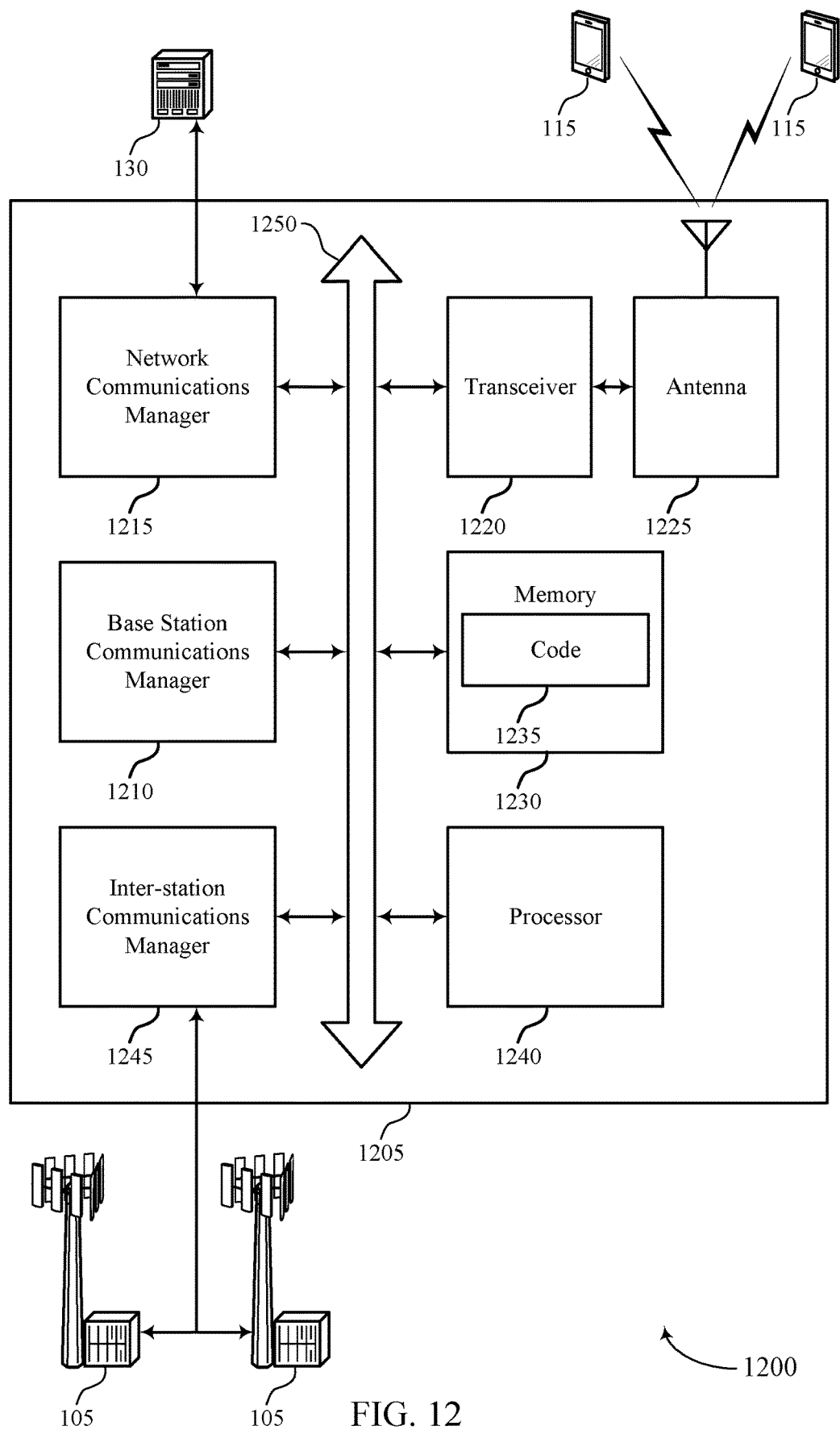
FIG. 12 shows a diagram of a system including a device that supports techniques for power control in mmW systems in accordance with one or more aspects of the present disclosure.

FIG. 12 shows a diagram of a system 1200 including a device 1205 that supports techniques for power control in mmW systems in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may transmit, to a second device, a configuration message that includes a set of power control parameters for communicating using a channel in a mmW frequency band, receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband, and communicate with the second device in accordance with the first timing and the second timing.

By including or configuring the base station communications manager 1210 in accordance with examples as described herein, the device 1205 may support techniques for improved power control, reliability, latency, data rates, spectral efficiency, power consumption, resource utilization, coordination between devices, and processing capability, among other benefits.

The network communications manager 1215 may manage communications with the core network 130 (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for power control in mmW systems).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
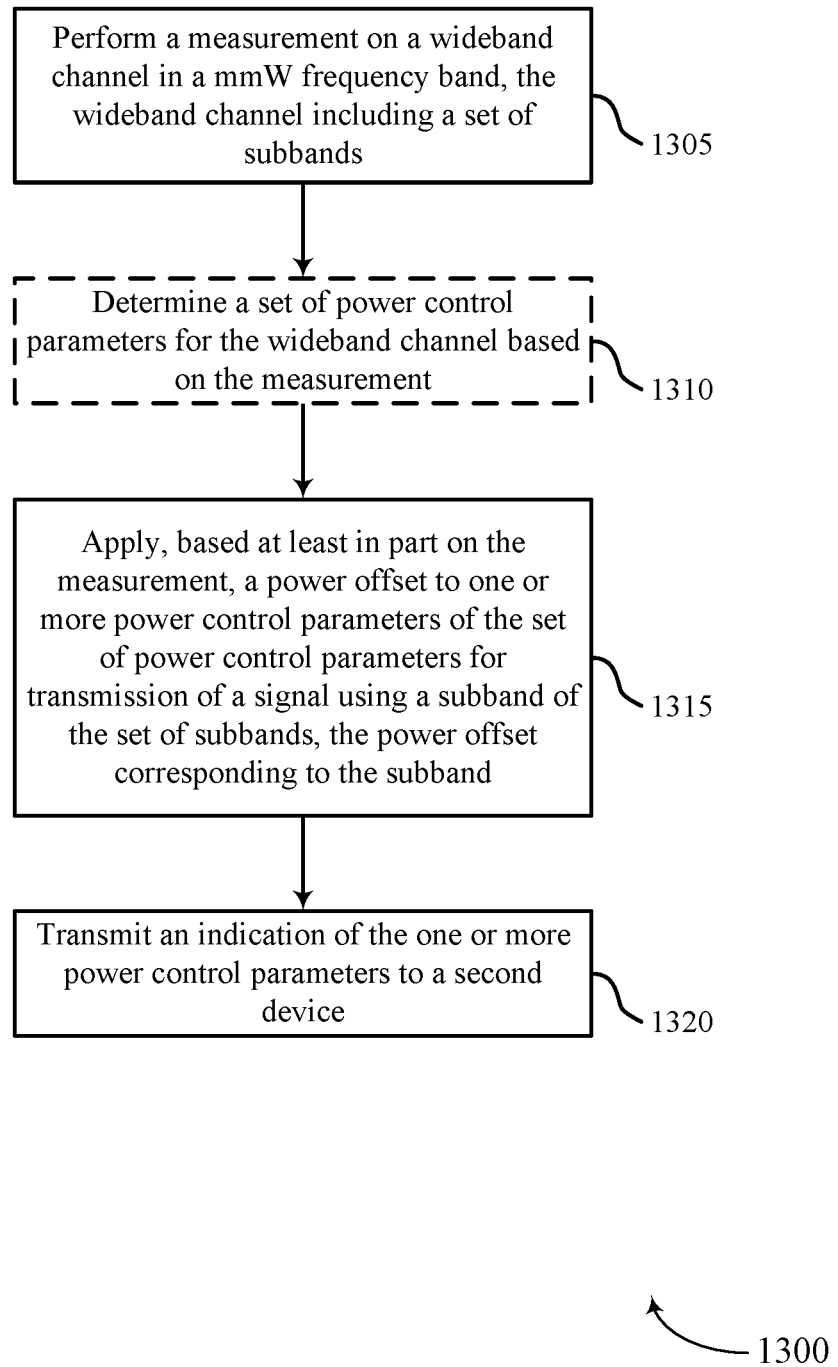
FIGS. 13 through 18 show flowcharts illustrating methods that support techniques for power control in mmW systems in accordance with aspects of the present disclosure.

FIG. 13 shows a flowchart illustrating a method 1300 that supports techniques for power control in mmW systems in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may perform a measurement on a wideband channel in a mmW frequency band, the wideband channel including a set of subbands. The operations of 1305 may be performed according to the methods described herein. In some examples, aspects of the operations of 1305 may be performed by a measurement component as described with reference to FIGS. 5 through 8.

At 1310, the UE may optionally determine a set of power control parameters for the wideband channel based on the measurement. The operations of 1310 may be performed according to the methods described herein. In some examples, aspects of the operations of 1310 may be performed by a power control parameter manager as described with reference to FIGS. 5 through 8.

At 1315, the UE may apply, based at least in part on the measurement, a power offset to one or more power control parameters of the set of power control parameters for transmission of a signal using a subband of the set of subbands, the power offset corresponding to the subband. The operations of 1315 may be performed according to the methods described herein. In some examples, aspects of the operations of 1315 may be performed by a power offset component as described with reference to FIGS. 5 through 8.

At 1320, the UE may transmit an indication of the one or more power control parameters to a second device. The operations of 1320 may be performed according to the methods described herein. In some examples, aspects of the operations of 1320 may be performed by a communication component as described with reference to FIGS. 5 through 8.

Figure 14:
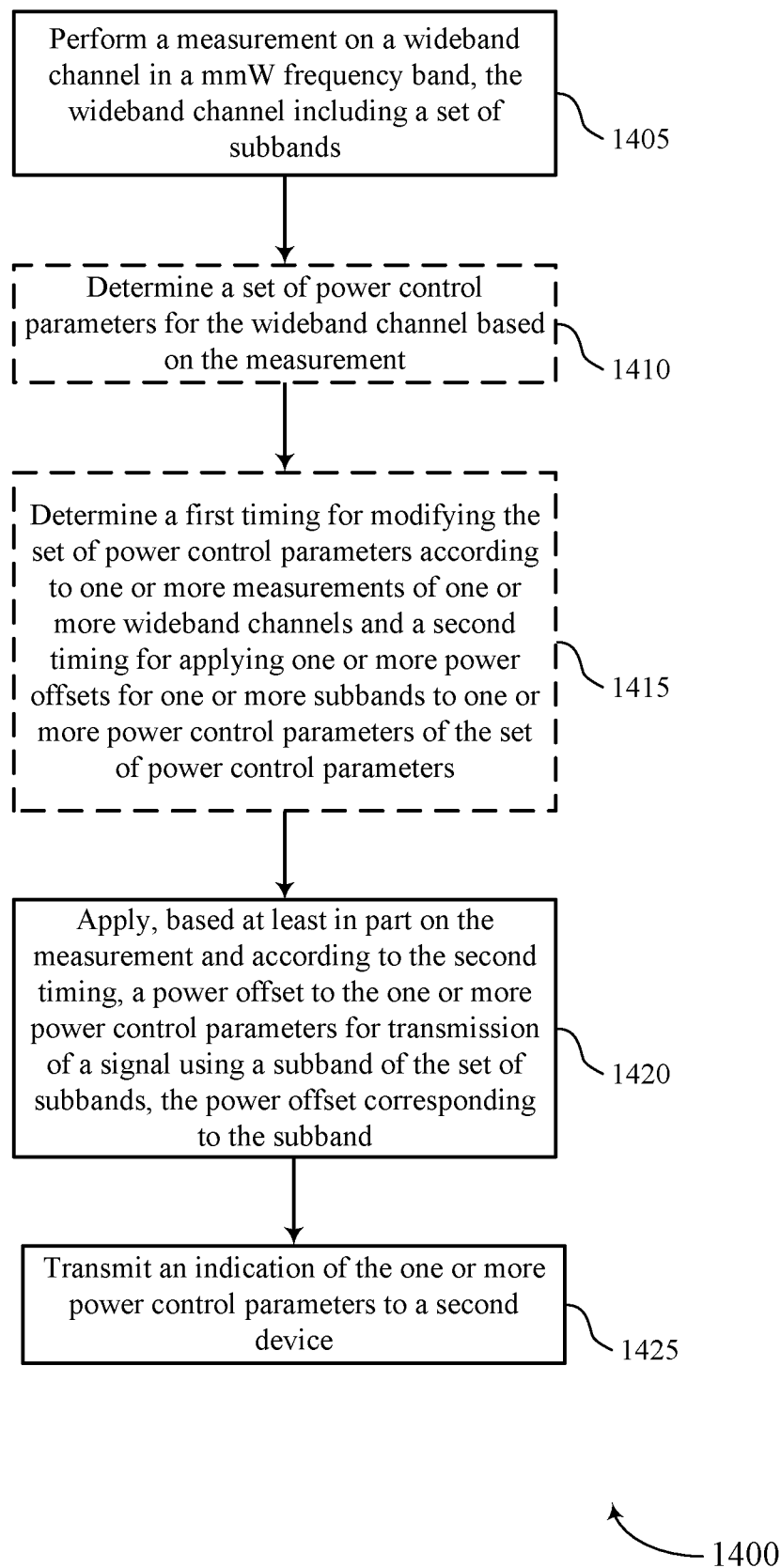

FIG. 14 shows a flowchart illustrating a method 1400 that supports techniques for power control in mmW systems in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may perform a measurement on a wideband channel in a mmW frequency band, the wideband channel including a set of subbands. The operations of 1405 may be performed according to the methods described herein. In some examples, aspects of the operations of 1405 may be performed by a measurement component as described with reference to FIGS. 5 through 8.

At 1410, the UE may optionally determine a set of power control parameters for the wideband channel based on the measurement. The operations of 1410 may be performed according to the methods described herein. In some examples, aspects of the operations of 1410 may be performed by a power control parameter manager as described with reference to FIGS. 5 through 8.

At 1415, the UE may optionally determine a first timing for modifying the set of power control parameters according to one or more measurements of one or more wideband channels and a second timing for applying one or more power offsets for one or more subbands to one or more power control parameters of the set of power control parameters. The operations of 1415 may be performed according to the methods described herein. In some examples, aspects of the operations of 1415 may be performed by a timing component as described with reference to FIGS. 5 through 8.

At 1420, the UE may apply, based at least in part on the measurement and according to the second timing, a power offset to the one or more power control parameters for transmission of a signal using a subband of the set of subbands, the power offset corresponding to the subband. The operations of 1420 may be performed according to the methods described herein. In some examples, aspects of the operations of 1420 may be performed by a power offset component as described with reference to FIGS. 5 through 8.

At 1425, the UE may transmit an indication of the one or more power control parameters to a second device. The operations of 1425 may be performed according to the methods described herein. In some examples, aspects of the operations of 1425 may be performed by a communication component as described with reference to FIGS. 5 through 8.

Figure 15:
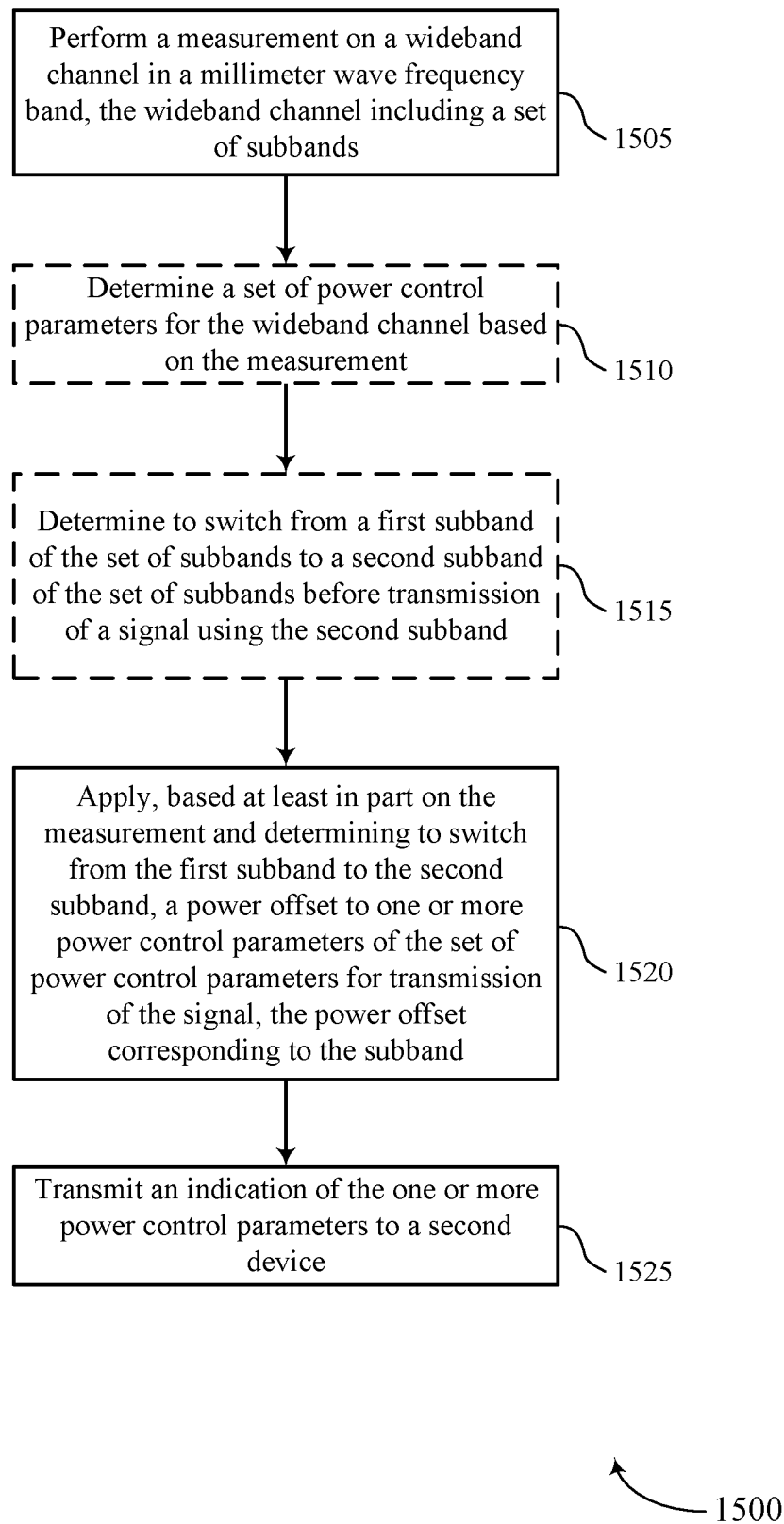

FIG. 15 shows a flowchart illustrating a method 1500 that supports techniques for power control in mmW systems in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may perform a measurement on a wideband channel in a mmW frequency band, the wideband channel including a set of subbands. The operations of 1505 may be performed according to the methods described herein. In some examples, aspects of the operations of 1505 may be performed by a measurement component as described with reference to FIGS. 5 through 8.

At 1510, the UE may optionally determine a set of power control parameters for the wideband channel based on the measurement. The operations of 1510 may be performed according to the methods described herein. In some examples, aspects of the operations of 1510 may be performed by a power control parameter manager as described with reference to FIGS. 5 through 8.

At 1515, the UE may optionally determine to switch from a first subband of the set of subbands to a second subband of the set of subbands before transmission of a signal using the second subband. The operations of 1515 may be performed according to the methods described herein. In some examples, aspects of the operations of 1515 may be performed by a switching component as described with reference to FIGS. 5 through 8.

At 1520, the UE may apply, based at least in part on the measurement and determining to switch from the first subband to the second subband, a power offset to one or more power control parameters of the set of power control parameters for transmission of the signal, the power offset corresponding to the subband. The operations of 1520 may be performed according to the methods described herein. In some examples, aspects of the operations of 1520 may be performed by a power offset component as described with reference to FIGS. 5 through 8.

At 1525, the UE may transmit an indication of the one or more power control parameters to a second device. The operations of 1525 may be performed according to the methods described herein. In some examples, aspects of the operations of 1525 may be performed by a communication component as described with reference to FIGS. 5 through 8.

Figure 16:
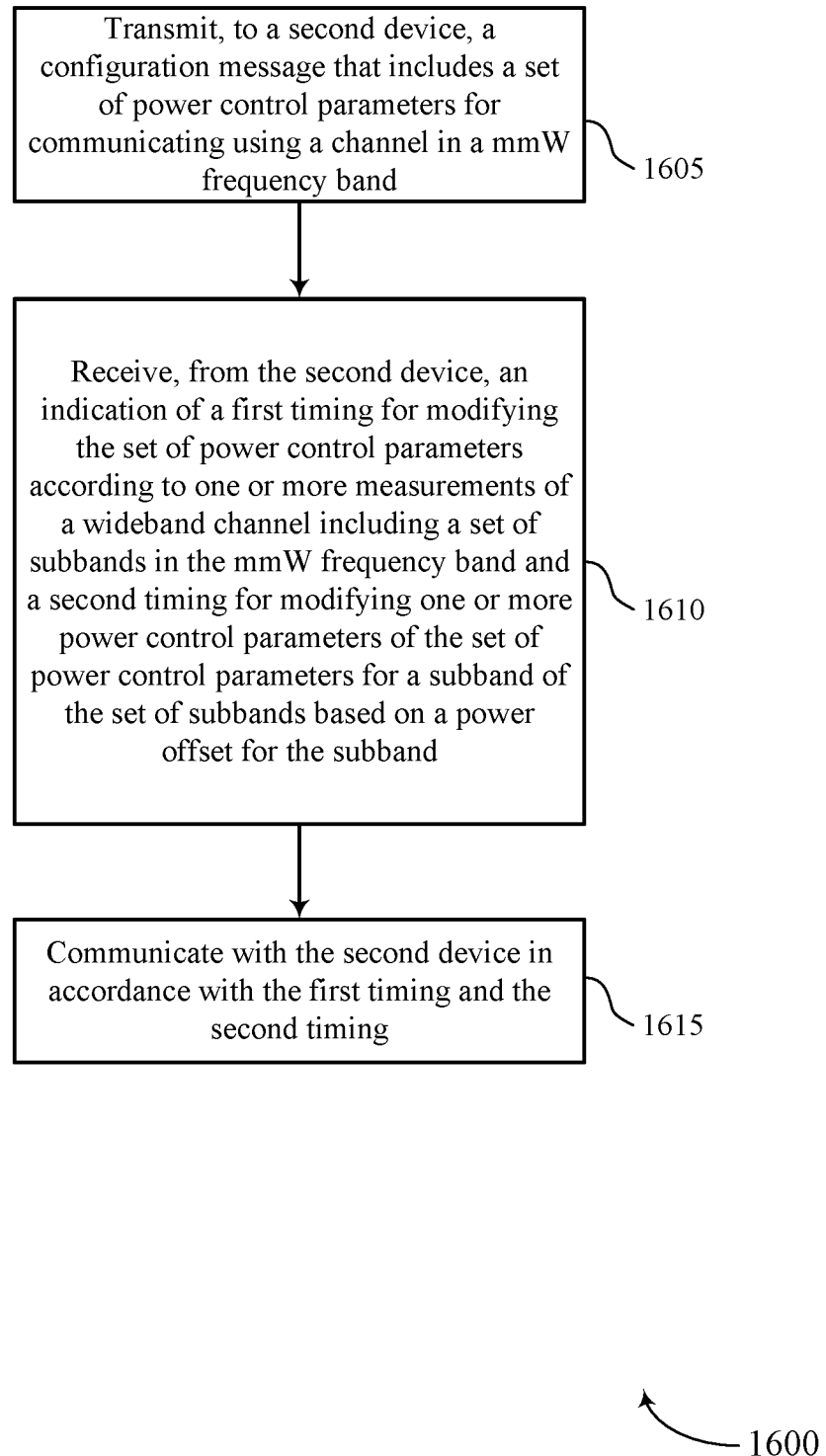

FIG. 16 shows a flowchart illustrating a method 1600 that supports techniques for power control in mmW systems in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, to a second device, a configuration message that includes a set of power control parameters for communicating using a channel in a mmW frequency band. The operations of 1605 may be performed according to the methods described herein. In some examples, aspects of the operations of 1605 may be performed by a power control parameter manager as described with reference to FIGS. 9 through 12.

At 1610, the base station may receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband. The operations of 1610 may be performed according to the methods described herein. In some examples, aspects of the operations of 1610 may be performed by a timing component as described with reference to FIGS. 9 through 12.

At 1615, the base station may communicate with the second device in accordance with the first timing and the second timing. The operations of 1615 may be performed according to the methods described herein. In some examples, aspects of the operations of 1615 may be performed by a timing component as described with reference to FIGS. 9 through 12.

Figure 17:
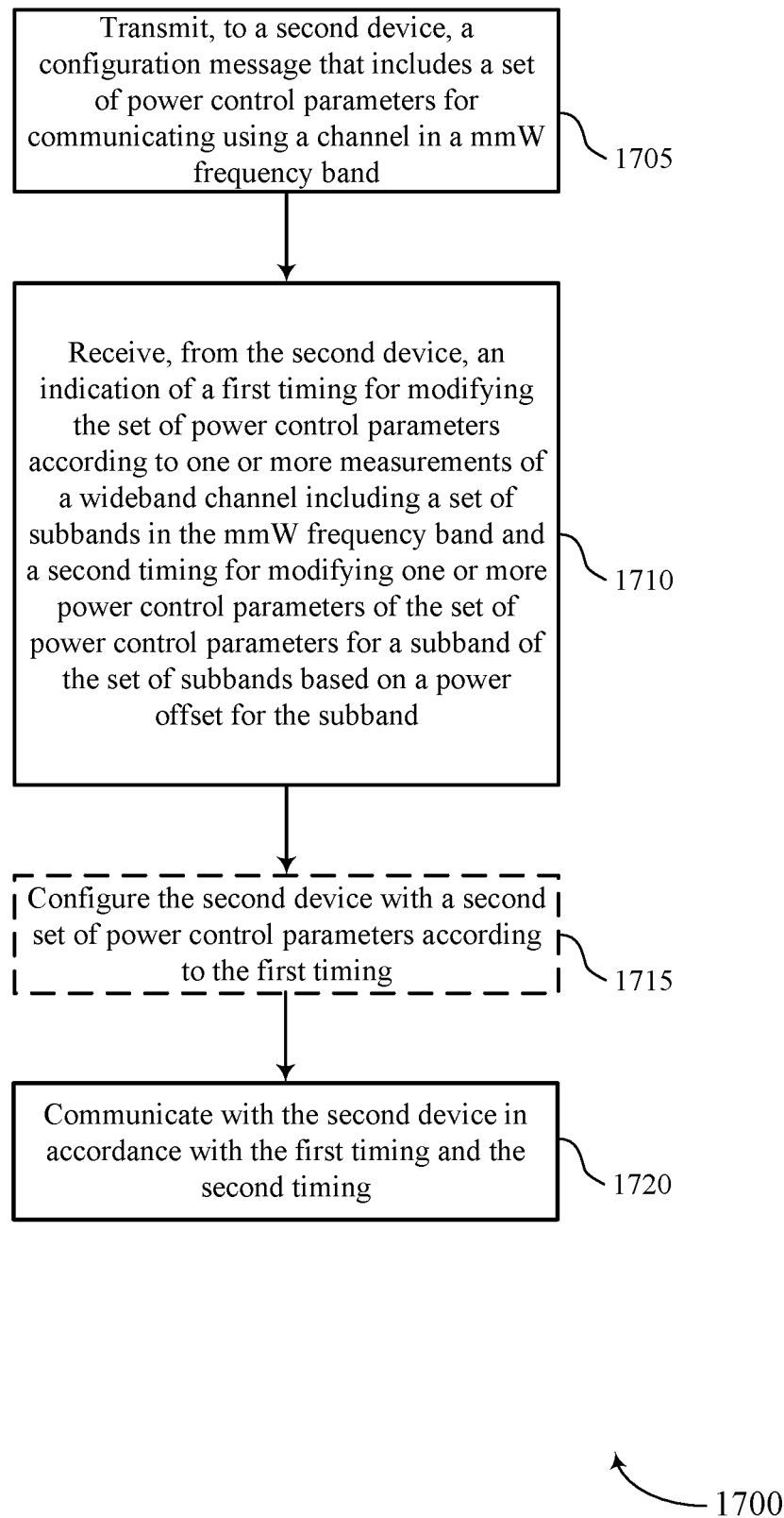

FIG. 17 shows a flowchart illustrating a method 1700 that supports techniques for power control in mmW systems in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a second device, a configuration message that includes a set of power control parameters for communicating using a channel in a mmW frequency band. The operations of 1705 may be performed according to the methods described herein. In some examples, aspects of the operations of 1705 may be performed by a power control parameter manager as described with reference to FIGS. 9 through 12.

At 1710, the base station may receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband. The operations of 1710 may be performed according to the methods described herein. In some examples, aspects of the operations of 1710 may be performed by a timing component as described with reference to FIGS. 9 through 12.

At 1715, the base station may optionally configure the second device with a second set of power control parameters according to the first timing. The operations of 1715 may be performed according to the methods described herein. In some examples, aspects of the operations of 1715 may be performed by a power control parameter manager as described with reference to FIGS. 9 through 12.

At 1720, the base station may communicate with the second device in accordance with the first timing and the second timing. The operations of 1720 may be performed according to the methods described herein. In some examples, aspects of the operations of 1720 may be performed by a timing component as described with reference to FIGS. 9 through 12.

Figure 18:
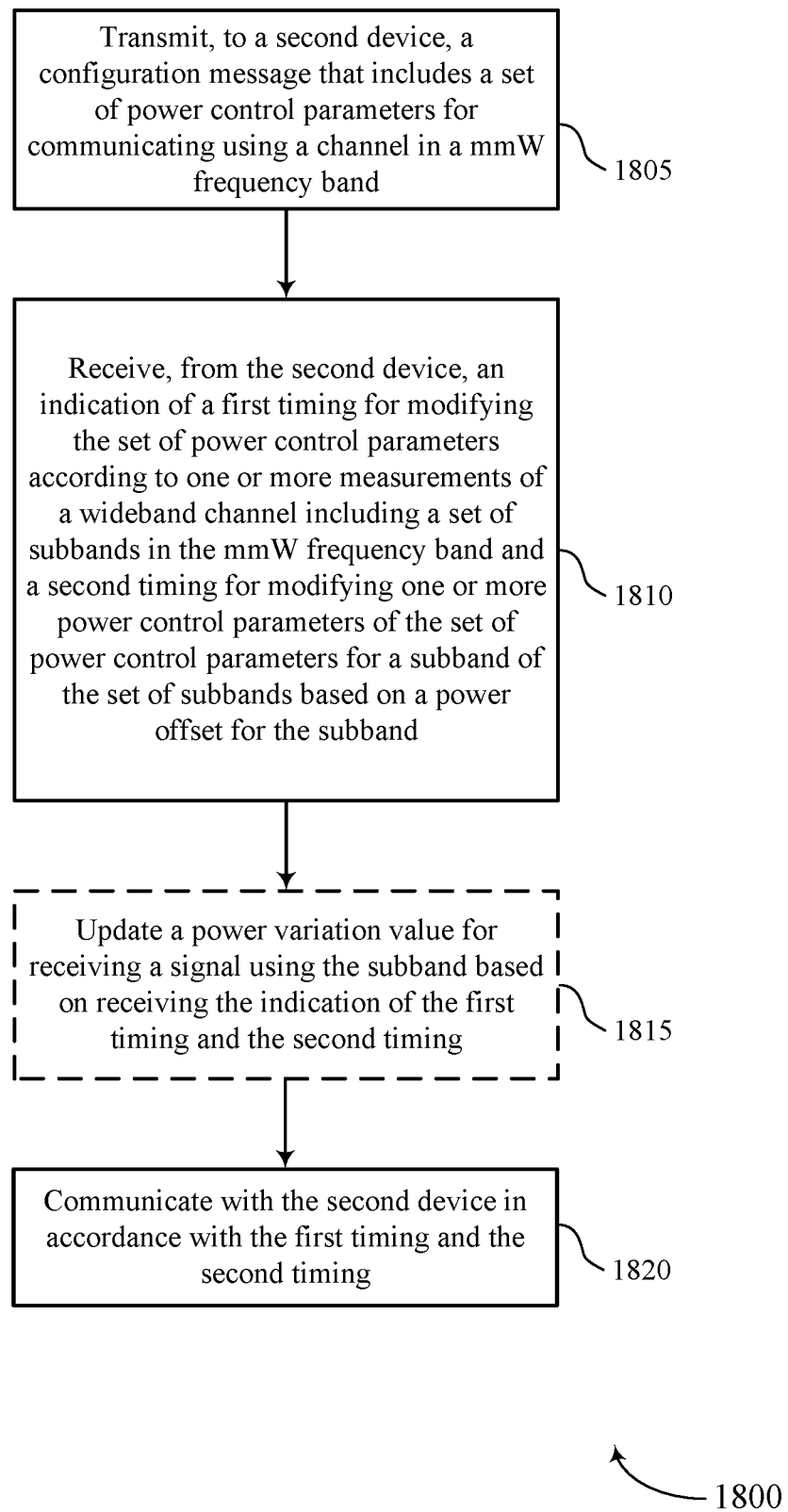

FIG. 18 shows a flowchart illustrating a method 1800 that supports techniques for power control in mmW systems in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may transmit, to a second device, a configuration message that includes a set of power control parameters for communicating using a channel in a mmW frequency band. The operations of 1805 may be performed according to the methods described herein. In some examples, aspects of the operations of 1805 may be performed by a power control parameter manager as described with reference to FIGS. 9 through 12.

At 1810, the base station may receive, from the second device, an indication of a first timing for modifying the set of power control parameters according to one or more measurements of a wideband channel including a set of subbands in the mmW frequency band and a second timing for modifying one or more power control parameters of the set of power control parameters for a subband of the set of subbands based on a power offset for the subband. The operations of 1810 may be performed according to the methods described herein. In some examples, aspects of the operations of 1810 may be performed by a timing component as described with reference to FIGS. 9 through 12.

At 1815, the base station may optionally update a power variation value for receiving a signal using the subband based on receiving the indication of the first timing and the second timing. The operations of 1815 may be performed according to the methods described herein. In some examples, aspects of the operations of 1815 may be performed by a power variation manager as described with reference to FIGS. 9 through 12.

At 1820, the base station may communicate with the second device in accordance with the first timing and the second timing. The operations of 1820 may be performed according to the methods described herein. In some examples, aspects of the operations of 1820 may be performed by a timing component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first device in a wireless communication system, comprising: performing a measurement on a wideband channel in a mmW frequency band, the wideband channel comprising a set of subbands; applying, based at least in part on the measurement, a power offset to one or more power control parameters of a set of power control parameters associated with the wideband channel for transmission of a signal using a subband of the set of subbands, the power offset corresponding to the subband; and transmitting an indication of the one or more power control parameters to a second device.

Aspect 2: The method of aspect 1, further comprising: determining a first timing for modifying the set of power control parameters according to one or more measurements of one or more wideband channels and a second timing for applying one or more power offsets for one or more subbands to the one or more power control parameters.

Aspect 3: The method of aspect 2, further comprising: transmitting, to the second device, a message that indicates the first timing, the second timing, or both.

Aspect 4: The method of any of aspects 2 and 3, the transmitting the indication of the one or more power control parameters comprising: transmitting the indication of the one or more power control parameters according to the second timing.

Aspect 5: The method of any of aspects 2 through 4, the performing the measurement of the wideband channel comprising: performing the measurement according to the first timing.

Aspect 6: The method of any of aspects 2 through 5, wherein the first timing is greater than the second timing.

Aspect 7: The method of any of aspects 1 through 6, further comprising: determining to switch from a second subband of the set of subbands to the subband before transmission of the signal, the power offset applied based at least in part on determining to switch from the second subband to the subband.

Aspect 8: The method of any of aspects 1 through 7, further comprising: receiving, from the second device, an indication of interference on the subband, the power offset applied based at least in part on receiving the indication of interference.

Aspect 9: The method of any of aspects 1 through 8, wherein the indication of the one or more power control parameters comprises an indication to modify one or more power control parameters at the second device for transmission of a second signal using the subband by the second device, the method further comprising: receiving, from the second device, the second signal using the subband based at least in part on the indication to modify one or more power control parameters at the second device.

Aspect 10: The method of any of aspects 1 through 9, the performing the measurement of the wideband channel comprising: performing the measurement based at least in part on a mobility of the first device, a change in a beam direction, a geometry associated with the first device or the second device, or a combination thereof.

Aspect 11: The method of any of aspects 1 through 10, the modifying the one or more power control parameters comprising: determining the power offset corresponding to the subband based at least in part on a frequency of the subband, a beam direction, a change in the beam direction, a mobility of the first device, a geometry associated with the first device or the second device, or a combination thereof.

Aspect 12: The method of any of aspects 1 through 11, the modifying the one or more power control parameters comprising: determining the power offset corresponding to the subband from a set of preconfigured power offsets for at least a subset of the set of subbands.

Aspect 13: The method of any of aspects 1 through 12, wherein: the first device comprises a first UE or a CPE; and the second device comprises a second UE, a base station, a TRP, a relay, a repeater, an access node, or an IAB node.

Aspect 14: The method of any of aspects 1 through 13, wherein the signal comprises a PUSCH, a PUCCH, or an SRS.

Aspect 15: A method for wireless communications at a first device in a wireless communication system, comprising: transmitting, to a second device, a configuration message that includes a set of power control parameters for communicating using a channel in a mmW frequency band; receiving, from the second device, an indication of a first timing for modifying the set of power control parameters according to one or more measurements of a wideband channel comprising a set of subbands in the mmW frequency band and a second timing for modifying one or more power control parameters of the set of power control parameters for a subband of the set of subbands based at least in part on a power offset for the subband; and communicating with the second device in accordance with the first timing and the second timing.

Aspect 16: The method of aspect 15, further comprising: configuring the second device with a second set of power control parameters according to the first timing.

Aspect 17: The method of any of aspects 15 and 16, further comprising: receiving, from the second device, an indication of the modified one or more power control parameters according to the second timing.

Aspect 18: The method of any of aspects 15 through 17, further comprising: updating a power variation value for receiving a signal using the subband based at least in part on receiving the indication of the first timing and the second timing.

Aspect 19: The method of any of aspects 15 through 18, wherein: the first device comprises a base station, a TRP, a relay, a repeater, an access node, or an IAB node; and the second device comprises a UE or a CPE.

Aspect 20: The method of any of aspects 15 through 19, wherein the first timing is greater than the second timing.

Aspect 21: An apparatus for wireless communication comprising at least one means for performing a method of any one of aspects 1 through 14.

Aspect 22: An apparatus for wireless communication comprising a processor and memory coupled to the processor, the processor and memory configured to perform a method of any one of aspects 1 through 14.

Aspect 23: A non-transitory computer-readable medium storing code for wireless communication, the code comprising instructions executable by a processor to perform a method of any one of aspects 1 through 14.

Aspect 24: An apparatus for wireless communication comprising at least one means for performing a method of any one of aspects 15 through 20.

Aspect 25: An apparatus for wireless communication comprising a processor and memory coupled to the processor, the processor and memory configured to perform a method of any one of aspects 15 through 20.

Aspect 26: A non-transitory computer-readable medium storing code for wireless communication, the code comprising instructions executable by a processor to perform a method of any one of aspects 15 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first device in a wireless communication system, comprising:
   a memory; and
   a processor coupled to the memory and configured to:
     perform an array gain measurement of a wideband channel in a millimeter wave frequency band to determine an array gain variation across a set of subbands of the wideband channel;
     apply, based at least in part on the array gain measurement, a power offset to one or more power control parameters of a set of power control parameters associated with the wideband channel for transmission of a signal using a subband of the set of subbands, the power offset corresponding to the subband and based at least in part on the array gain variation; and
     transmit an indication of the one or more power control parameters to a second device.

2. The apparatus of claim 1, wherein the processor is further configured to:
   determine a first timing for modifying the set of power control parameters according to one or more array gain measurements of one or more wideband channels and a second timing for applying one or more power offsets for one or more subbands to the one or more power control parameters.

3. The apparatus of claim 2, wherein the processor is further configured to:
   transmit, to the second device, a message that indicates the first timing, the second timing, or both.

4. The apparatus of claim 2, wherein the processor is further configured to:
   transmit the indication of the one or more power control parameters according to the second timing.

5. The apparatus of claim 2, wherein the processor is further configured to:
   perform the array gain measurement according to the first timing.

6. The apparatus of claim 2, wherein the first timing is greater than the second timing.

7. The apparatus of claim 1, wherein the processor is further configured to:
   switch from a second subband of the set of subbands to the subband before transmission of the signal, the power offset applied based at least in part on the switch from the second subband to the subband.

8. The apparatus of claim 1, wherein the processor is further configured to:
receive, from the second device, an indication of interference on the subband, the power offset applied based at least in part on receiving the indication of interference.

9. The apparatus of claim 1, wherein the indication of the one or more power control parameters comprises an indication to modify one or more power control parameters at the second device for transmission of a second signal using the subband by the second device, and the processor is further configured to:
receive, from the second device, the second signal using the subband based at least in part on the indication to modify the one or more power control parameters at the second device.

10. The apparatus of claim 1, wherein the processor is further configured to:
perform the array gain measurement based at least in part on a mobility of the first device, a change in a beam direction, a geometry associated with the first device or the second device, or a combination thereof.

11. The apparatus of claim 1, wherein the processor is further configured to:
determine the power offset corresponding to the subband based at least in part on a frequency of the subband, a beam direction, a change in the beam direction, a mobility of the first device, a geometry associated with the first device or the second device, or a combination thereof.

12. The apparatus of claim 1, wherein the processor is further configured to:
determine the power offset corresponding to the subband from a set of preconfigured power offsets for at least a subset of the set of subbands.

13. The apparatus of claim 1, wherein:
the first device comprises a first user equipment (UE) or a customer premises equipment; and
the second device comprises a second UE, a base station, a transmission reception point, a relay, a repeater, an access node, or an integrated access and backhaul node.

14. The apparatus of claim 1, wherein the signal comprises a physical uplink shared channel, a physical uplink control channel, or a sounding reference signal.

15. A method for wireless communications at a first device in a wireless communication system, comprising:
performing an array gain measurement of a wideband channel in a millimeter wave frequency band to determine an array gain variation across a set of subbands of the wideband channel;
applying, based at least in part on the array gain measurement, a power offset to one or more power control parameters of a set of power control parameters associated with the wideband channel for transmission of a signal using a subband of the set of subbands, the power offset corresponding to the subband and based at least in part on the array gain variation; and
transmitting an indication of the one or more power control parameters to a second device.

16. The method of claim 15, further comprising:
determining a first timing for modifying the set of power control parameters according to one or more array gain measurements of one or more wideband channels and a second timing for applying one or more power offsets for one or more subbands to the one or more power control parameters.

17. The method of claim 16, further comprising:
transmitting, to the second device, a message that indicates the first timing, the second timing, or both.

18. The method of claim 16, further comprising:
transmitting the indication of the one or more power control parameters according to the second timing.

19. The method of claim 16, further comprising:
performing the array gain measurement according to the first timing.

20. The method of claim 16, wherein the first timing is greater than the second timing.

21. The method of claim 15, further comprising:
switching from a second subband of the set of subbands to the subband before transmission of the signal, the power offset applied based at least in part on switching from the second subband to the subband.

22. The method of claim 15, further comprising:
receiving, from the second device, an indication of interference on the subband, the power offset applied based at least in part on receiving the indication of interference.

23. The method of claim 15, wherein the indication of the one or more power control parameters comprises an indication to modify one or more power control parameters at the second device for transmission of a second signal using the subband by the second device, the method further comprising:
receiving, from the second device, the second signal using the subband based at least in part on the indication to modify the one or more power control parameters at the second device.

24. The method of claim 15, further comprising:
performing the array gain measurement based at least in part on a mobility of the first device, a change in a beam direction, a geometry associated with the first device or the second device, or a combination thereof.

25. The method of claim 15, further comprising:
determining the power offset corresponding to the subband based at least in part on a frequency of the subband, a beam direction, a change in the beam direction, a mobility of the first device, a geometry associated with the first device or the second device, or a combination thereof.

26. The method of claim 15, further comprising:
determining the power offset corresponding to the subband from a set of preconfigured power offsets for at least a subset of the set of subbands.

27. The method of claim 15, wherein:
the first device comprises a first user equipment (UE) or a customer premises equipment; and
the second device comprises a second UE, a base station, a transmission reception point, a relay, a repeater, an access node, or an integrated access and backhaul node.

28. The method of claim 15, wherein the signal comprises a physical uplink shared channel, a physical uplink control channel, or a sounding reference signal.

29. An apparatus for wireless communications at a first device in a wireless communication system, comprising:
means for performing an array gain measurement of a wideband channel in a millimeter wave frequency band to determine an array gain variation across a set of subbands of the wideband channel;
means for applying, based at least in part on the array gain measurement, a power offset to one or more power control parameters of a set of power control parameters associated with the wideband channel for transmission of a signal using a subband of the set of subbands, the power offset corresponding to the subband and based at least in part on the array gain variation; and means for transmitting an indication of the one or more power control parameters to a second device.

30. A non-transitory computer-readable medium storing code for wireless communications, the code comprising instructions executable by a processor to:

perform an array gain measurement of a wideband channel in a millimeter wave frequency band to determine an array gain variation across a set of subbands of the wideband channel;

apply, based at least in part on the array gain measurement, a power offset to one or more power control parameters of a set of power control parameters associated with the wideband channel for transmission of a signal using a subband of the set of subbands, the power offset corresponding to the subband and based at least in part on the array gain variation; and transmit an indication of the one or more power control parameters to a second device.

* * * * *